US011898710B2

(12) United States Patent
Zhou

(10) Patent No.: US 11,898,710 B2
(45) Date of Patent: Feb. 13, 2024

(54) FLAME SIMULATING DEVICE AND ATOMIZING SIMULATION FIREPLACE INCLUDING SAME

(71) Applicant: NINGBO RICHEN ELECTRICAL APPLIANCE CO., LTD, Ningbo (CN)

(72) Inventor: Yin Zhou, Ningbo (CN)

(73) Assignee: NINGBO RICHEN ELECTRICAL APPLIANCE CO., LTD, Ningbo (CN)

( * ) Notice: Subject to any disclaimer, the term of this patent is extended or adjusted under 35 U.S.C. 154(b) by 0 days.

(21) Appl. No.: 17/690,412

(22) Filed: Mar. 9, 2022

(65) Prior Publication Data

US 2022/0268411 A1 Aug. 25, 2022

Related U.S. Application Data

(63) Continuation-in-part of application No. 16/585,354, filed on Sep. 27, 2019, now abandoned.

(30) Foreign Application Priority Data

May 31, 2019 (CN) ........................ 201910470468.X
May 31, 2019 (CN) ........................ 201920812881.5
Mar. 7, 2022 (CN) ........................ 202220478526.0

(51) Int. Cl.
*B05B 7/00* (2006.01)
*F21S 10/04* (2006.01)
(Continued)

(52) U.S. Cl.
CPC ............ *F21S 10/04* (2013.01); *B05B 7/0087* (2013.01); *F21S 10/002* (2013.01); *F24B 1/1808* (2013.01); *F24D 13/00* (2013.01)

(58) Field of Classification Search
CPC ....... F21S 10/04; F21S 10/002; F24B 1/1808; F24D 13/00
(Continued)

(56) References Cited

U.S. PATENT DOCUMENTS 5,086,494 A * 2/1992 Wang ...................... F22B 1/284 392/394
5,989,128 A 11/1999 Baker
(Continued)

FOREIGN PATENT DOCUMENTS

CN 200920118478.9 4/2010
CN 208703822 U 4/2019
(Continued)

OTHER PUBLICATIONS

Extended European Search Report issued in counterpart Application No. EP 19 20 6106 dated May 11, 2020.
(Continued)

*Primary Examiner* — Chee-Chong Lee
(74) *Attorney, Agent, or Firm* — Charles C. Achkar; Ostrolenk Faber LLP.

(57) ABSTRACT

The present invention discloses a flame simulating device, comprising a mist generating chamber, an atomizing head, an air orifice and a nozzle. The inside of the mist generating chamber is provided with a liquid and the atomizing head, the atomizing head being capable of atomizing the liquid inside the mist generating chamber, the two sides of the nozzle being set as Coanda curved surfaces, the cross section of the air orifice being in a constricted shape and providing an air flow blown upward such that under the Venturi effect, the air flow blown upward will guide and attract the mist from inside the mist generating chamber to vent out and flow into a nozzle inlet; the upper surface of the mist generating chamber is provided with a breathing port, and the breathing port directly faces the atomizing head. Due to the Coanda curved surface on the side of the nozzle, the mist flows along both sides of the nozzle under the Coanda effect and then vents out of the nozzle.

15 Claims, 21 Drawing Sheets

(51) Int. Cl.

| | |
|---|---|
| ***F24D 13/00*** | (2006.01) |
| ***F21S 10/00*** | (2006.01) |
| ***F24B 1/18*** | (2006.01) |

(58) Field of Classification Search

USPC .............................................................. 239/8

See application file for complete search history.

(56) References Cited

U.S. PATENT DOCUMENTS

| | | | | |
|---|---|---|---|---|
| 6,050,011 | A | 4/2000 | Hess | |
| 2003/0110671 | A1* | 6/2003 | Hess | G09F 19/12 472/65 |
| 2006/0191915 | A1* | 8/2006 | Kanzaki | F24C 15/003 219/682 |
| 2008/0028648 | A1* | 2/2008 | O'Neill | F24C 7/004 40/428 |
| 2008/0223953 | A1* | 9/2008 | Tomono | A61M 11/005 128/200.16 |
| 2010/0031543 | A1* | 2/2010 | Rice | F24C 7/004 40/428 |
| 2010/0299980 | A1 | 12/2010 | Betz | |
| 2011/0280767 | A1 | 11/2011 | Goessens | |
| 2011/0286725 | A1* | 11/2011 | O'Toole | F24C 7/004 392/407 |
| 2013/0031816 | A1* | 2/2013 | Deng | F24C 7/004 40/428 |
| 2013/0249126 | A1* | 9/2013 | Staniforth | F24F 13/26 261/141 |

FOREIGN PATENT DOCUMENTS

| | | | |
|---|---|---|---|
| EP | 3115696 | A2 | 1/2017 |
| EP | 3267112 | A2 | 1/2018 |
| EP | 3745029 | | 4/2022 |
| WO | WO 03084671 | A1 | 10/2003 |
| WO | WO 2009034021 | A2 | 3/2009 |

OTHER PUBLICATIONS

Decision to grant a EP application EP 19 20 6106 dated Mar. 11, 2022.

* cited by examiner

FLAME SIMULATING DEVICE AND ATOMIZING SIMULATION FIREPLACE INCLUDING SAME

CROSS REFERENCE TO RELATED APPLICATIONS

The present application is a Continuation-in Part of U.S. application Ser. No. 16/585,354 filed Sep. 27, 2019, which claims priority to China Application No. China Application No. 201910470468.X filed on May 31, 2019 and China Application No. 201920812881.5 filed May 31, 2019, and claims priority to China Application No. 20222047856.0 filed Mar. 7, 2022, the subject matter of each of which are incorporated herein by reference in their entirety.

TECHNICAL FIELD

The present invention belongs to the technical field of atomizing electric fireplaces and relates to a flame simulating device for forming a flame shape by an atomizing device and an atomizing simulation fireplace including the same.

BACKGROUND ART

At present, most of the electric fireplace flame simulating devices on the market use a light source to irradiate the moving parts, and then the reflective elements on the moving parts are used for reflective projection imaging, for example, the simulation flame simulating device that is mentioned in CN 200920118478.9. This kind of flame simulating device typically requires an imaging screen with a flat flame projection that lacks a three-dimensional feel. To enhance the three-dimensional effect, some flame simulating devices add a simulated fuel bed with light, but the simulated fuel bed is usually only self-illuminating and cannot form the shape of leaping flames, so it is not realistic.

There are also some atomizing electric fireplaces in which a three-dimensional flame simulation is realized by combining mist or water vapor with a light. By opening a flame outlet in the longitudinal direction on the fuel bed, the mist is sprayed upward to form a flame shape. However, the flame simulating device currently on the market usually needs not only to introduce a disturbing air flow inside the mist generating chamber to cause mist or water vapor to flow out from the atomizer, but also to provide a guiding air flow for guiding the mist to flow upward after the mist or water vapor emerges from the atomizer, thus, having a complicated structure and taking up space. In addition, since the projection light needs to irradiate upward from the bottom of the atomizing nozzle and provide an upward passage for the guiding air flow, an opening is generally required between the atomizing nozzle and the housing, so that the mist or water vapor emerging from the mist generating chamber is not isolated from the electrical components inside the fireplace, and the inside of the electric fireplace can easily get wet, causing damages to the components, and even risks to personal safety.

SUMMARY

The technical problem to be solved by the present invention is to provide a flame simulating device. After the present invention is used for flame simulation of the atomizing electric fireplace, the surface of the housing is provided with an opening along the longitudinal direction, a mist generating chamber is also disposed along the longitudinal direction, and a nozzle for spraying mist is disposed toward an opening on the housing. Then, it is only necessary to uniformly guide the mist inside the mist generating chamber along the nozzle in the longitudinal direction to flow out and then upward, without additionally introducing a disturbing air flow into the inside of the mist generating chamber. The air flow from the mist generating chamber is guided to flow in the direction of the mist outlet of the mist generating chamber. The Venturi effect is utilized to attract and guide the mist inside the mist generating chamber out. The guiding air flow does not enter the inside of the mist generating chamber to directly act on the mist and does not disturb the mist in the mist generating chamber, thereby preventing the mist inside of the mist generating chamber from flowing in an uncontrollable direction. The present invention is simple in structure and convenient to mount. The use of the Coanda surface in the nozzle can not only slow down the upward fluttering speed of the mist, but also increase the thickness of the mist, such that the mist (flame) in the longitudinal direction is thicker, making the upward fluttering flow of the foggy mist more lively, thicker and denser. In addition, through a transparent cover in the longitudinal direction, the mist from the atomizing nozzle is isolated from the internal space of the product to protect the electrical components, so the present invention is suitable for most flame simulation effects.

The technical solution adopted by the present invention to solve the above technical problem is: a flame simulating device includes a mist generating chamber, an atomizing head, an air orifice and a nozzle. The nozzle is elongated in the longitudinal direction and is defined by nozzle walls on both sides, and one or two nozzle walls of the nozzle are curved surfaces with a Coanda curved surface shape. The air orifice is disposed below the nozzle. The air orifice is defined by air orifice walls on both sides. The cross-sectional shape of the air orifice is a flared, triangular or trapezoidal shape that is constricted with a gentle and smooth transition, and the top of the air orifice is constricted into an air nozzle. The mist generating chamber is confined by a mist generating chamber housing and is provided with a mist outlet along the longitudinal direction, and the mist outlet communicates with the nozzle. The mist outlet is defined by a space between the air orifice walls and the mist generating chamber housing, and the air flow provided by the air nozzle is blown upward along the mist outlet and into the inlet end of the nozzle. The inside of the mist generating chamber is further provided with a liquid and an atomizing head, and the liquid level is a certain height over the atomizing head. The atomizing head is a device capable of atomizing the liquid, such as an atomizing head made by the principle of ultrasonic oscillation, and one or two or more are required according to the length of the nozzle, so that the mist is uniformly generated along the longitudinal direction. A position of the upper surface of the mist generating chamber directly facing the atomizing head is provided with an operation cover, and a breathing port is formed in the operation cover.

In addition, an air duct is disposed along the longitudinal direction of the air orifice and is connected to the air orifice, and an upward air force is supplied to the air orifice by the air duct.

Further, the air duct is disposed below the air orifice and uniformly arranged along the longitudinal direction of the air orifice, and a fan is disposed on a side wall and/or a bottom wall of the air duct. The air force is provided by the fan. One or two or more fans are disposed according to the length of the air duct such that the air force is uniform.

Further, in order to provide a more uniform air force in the longitudinal direction in the air duct, a spoiler is disposed inside the air duct, and the air force provided by the fan is subjected to the action of the spoiler so that the air force from the air duct enters the air orifice more uniformly.

Further, the inside of the air duct is provided with a heating element, and the heating element is capable of heating the air flow with the air force inside the air duct. Preferably, said heating element is mounted on the spoiler and facing the side of the fan.

Further, in order to optimize the converging effect of the flared, triangular or trapezoidal constriction of the air orifice on the air force, a width dimension A of the air nozzle is preferably 0.5 mm to 6 mm.

Further, the minimum dimension B of the cross section of the nozzle is preferably 2 mm to 20 mm.

Further, inside the mist generating chamber, a water retaining plate is disposed before the mist outlet. While the atomizing head generates mist, small water droplets having a larger size may be generated, and the mist may also condense into small water droplets having a larger size. The water retaining plate can block the small water droplets from entering the mist outlet.

Further, a water retaining cover is disposed above the atomizing head, an upper space of the mist generating chamber is provided with an inclined plane, an included angle $\angle\alpha$ between the inclined plane and the horizontal plane is 6 degrees to 18 degrees, the inclined plane is located between the breathing port and the atomizing head, a via hole is formed in a position of the inclined plane corresponding to the water retaining cover, and there is a gap allowing the air flow to pass between the via hole and the water retaining cover. The water retaining cover can prevent larger-particle water drops sprayed out from the atomizing head from rushing out of the breathing port. In operation, an air pressure inside the mist generating chamber is reduced when the mist floats out of the mist generating chamber through the mist outlet, at this time, it is necessary to supplement air flow to the inside of the mist generating chamber through the breathing port, and the gap between the via hole and the water retaining cover can allow air flow entering from the breathing port to enter the mist generating chamber. In addition, since the via hole is located above the atomizing head, the air flow entering from the breathing port can directly drive the mist generated by the atomizing head, and the inclined plane further guides the air flow to flow to the direction of the mist outlet.

The flame simulating device further includes a light source and a transparent cover. A light source is disposed right below or obliquely below the nozzle, or on one side or both sides of the nozzle, and the light emitted from the light source irradiates upward on and above the outlet of the nozzle. The light emitted from the light source may be monochromatic, preferably yellow or amber, or may be polychromatic. At least the nozzle wall adjacent to one side of the light source is made of a transparent material. In order to enable as much as possible of the light emitted by the light source to irradiate upward, between an upper end opening of the nozzle and an outer casing of the flame simulating device, a transparent cover is disposed above the light source. The transparent cover is capable of sealing a region between an opening on the outer casing and the nozzle, and allows the light emitted by the light source to irradiate on and above the outlet of the nozzle through the transparent cover. Preferably, the transparent cover and the nozzle wall on the same side may be integrated.

The flame simulating device forms an atomizing device in the case of no light source. That is, in one aspect, the present invention also provides an atomizing device, including a mist generating chamber, an atomizing head, an air orifice and a nozzle. The nozzle is disposed above the mist generating chamber, and the air orifice is disposed below the nozzle. The mist generating chamber is defined by a mist generating chamber housing. The mist generating chamber is provided with a mist outlet, and the mist outlet, the air orifice and the nozzle communicate with each other. An air flow blown from the air orifice converges by an increasingly smaller width A of the air nozzle in the air orifice and is then discharged, and, while flowing to the nozzle, the converging air flow adsorbs and guides the mist out of the mist outlet under the Venturi effect to discharge from the nozzle.

In another aspect, the invention also provides an atomizing simulation fireplace including the above flame simulating device. The technical solution adopted by the present invention to solve the technical problem is: the atomizing simulation fireplace further includes an outer casing and a simulated fuel bed. The mist generating chamber, the atomizing head, the air orifice, the nozzle and the light source are all disposed inside the outer casing, and the outlet of the nozzle communicates with the outside of the upper surface of the outer casing. The simulated fuel bed is disposed on the upper surface of the outer casing, and the simulated fuel bed does not completely cover the nozzle.

Further, the simulated fuel bed may be a combination of transparent irregular particles such as an ash bed, a simulated solid fuel, crystal stones or glass blocks or opaque cobblestone, and may be only one of them, or a combination of two or more. The ash bed is a structure simulating the ash, residual material and residual fire generated by the combustion of a real solid fuel, and the simulated solid fuel is a simulation of a real solid fuel such as firewood, coke, etc. The ash bed and the simulated solid fuel may be separate or integral. The ash bed is provided with a flame outlet corresponding to the position of the nozzle in the longitudinal direction, and the simulated solid fuel is placed, staggered, above the flame outlet. The simulated carbon bed and/or the simulated solid fuel are/is made of a transparent or translucent material. The simulated carbon bed and/or simulated solid fuel is a self-illuminating simulated carbon bed and/or simulated solid fuel with a light source inside. The surface region of the transparent irregular particles such as the crystal stones or the glass blocks or the opaque pebbles is sprayed or coated with a black or gray color to simulate the carbon ash which has not been completely burned.

Further, the ash bed and the simulated solid fuel are a self-illuminating ash bed and a simulated solid fuel with a light source inside and/or on the surface. The light emitted by the light source irradiates not only on the outlet of the nozzle but also on the outlet of the flame outlet and thereabove.

During operation, the atomizing head is energized to atomize the liquid inside the mist generating chamber, and the mist is collected above the liquid level of the mist generating chamber. The fan is energized to generate an air force, and the air force is subjected to the action of the spoiler to be uniformly blown into the air duct along the longitudinal direction, thereby entering the air orifice. The cross-sectional shape of the air orifice is a flared, triangular or trapezoidal shape that is constricted with a gentle and smooth transition, and thus, has a further converging and guiding effect on the air flow in the air duct, and the air flow is blown out from the air nozzle uniformly and vertically upward in the longitudinal direction. Due to the flow of the air blown from the air nozzle, a low pressure is formed in the outlet region of the air nozzle, and the air nozzle outlet provides an air flow along the mist outlet direction. Under the Venturi effect, the air flow blown by the air nozzle has an adsorption effect on the mist outlet, so that the mist in the mist generating chamber is attracted to this region through the mist outlet, and the mist from the mist outlet and the guiding air flow from the air nozzle form an air-mist mixture to enter a lower end inlet of the nozzle together. Since one or two nozzle walls of the nozzle are set as the Coanda surfaces, according to the principle of the Coanda Effect (also referred to as the wall-attachment effect), as long as the curvature is not large, the fluid will flow along the surface of the object, that is, away from the original flow direction, but flow along the surface of the convex object. It can be known that the air-mist mixture entering the inlet end of the nozzle will flow along the surface of the nozzle wall, thereby the air-mist mixture is expanded, and slowly flutters out of the upper end outlet of the nozzle and flows upward to enter the flame outlet. After the mist passes through the flame outlet, it flutters in the gap between the simulated solid fuel or the crystal stones or the glass blocks or the pebbles. At the same time, the light source disposed below the nozzle is energized to emit light irradiating upward, and since at least the nozzle wall adjacent to one side of the light source and the transparent cover are made of a transparent material, the light emitted by the light source can penetrate the nozzle wall and the transparent cover, irradiate on the outlet of the flame outlet and thereabove, and then irradiate on the air-mist mixture fluttering out from the flame outlet. During the upward fluttering of the air-mist mixture, various ascending shapes are formed, and under the action of the light irradiation, the mixture slowly flutters in the gap between the simulated solid fuel or the crystal stones or the glass blocks or the pebbles to form an effect similar to the shape of a fluttering flame, thereby simulating the flame effect of a solid fuel combustion state. Since the nozzle is elongated, a burning flame in the longitudinal direction is formed.

Since the transparent cover seals a region between the opening on the outer casing and the nozzle, the mist fluttering out of the nozzle cannot enter the inside of the flame simulating device, thereby protecting the electrical elements inside the flame simulating device.

Since the inside of the air duct is provided with the heating element, the air blown from the air nozzle has a certain amount of heat, and after the air is mixed with the mist, the air-mist mixture also has a certain amount of heat entering the nozzle, so that the air-mist mixture also has a certain amount of heat after fluttering out of the nozzle. According to the principle of aerothermodynamics, a hot gas rises and a cold gas sinks, and then the air-mist mixture will continue to flutter upward under the thermodynamic effect, so that the flame becomes higher and larger and the flame has a lively burning effect.

The light emitted by the light source may be monochromatic or polychromatic and may form an effect of various flame colors.

In addition, the operation cover and the water retaining cover are both detachable, and the atomizing head is disposed in a groove at the bottom inside the mist generating chamber. When the atomizing head is out of order and needs to be repaired, the atomizing head can be easily replaced by dismantling the operation cover and the water retaining shield.

Further, a liquid level gauge is disposed in the mist generating chamber, and the liquid level gauge can detect whether the liquid in the mist generating chamber is in a working liquid level range of the atomizing head, and control the liquid level in the mist generating chamber to be within the working liquid level range of the atomizing head through a certain control program and a liquid inlet pipe.

Further, the inside of the outer casing is further provided with a liquid storage tank, and the liquid storage tank can store a liquid to replenish the mist generating chamber with the liquid.

Further, the atomizing simulation fireplace can be placed, in its entirety, in a fireplace cabinet to simulate a conventional fireplace outline structure.

In another aspect of the present invention, a flame simulating method is provided, including the following steps:

providing a mist generating chamber having a mist outlet, where the liquid is atomized in the mist generating chamber to generate mist;

forming a low-pressure region, where the low-pressure region is adjacent to the mist outlet and communicates with the mist outlet;

providing a nozzle communicating with the low-pressure region; where the nozzle is located above the low-pressure region; the low-pressure region adsorbs the mist in the mist generating chamber such that the mist in the mist generating chamber exits from the mist outlet and flows to the low-pressure region and up through the nozzle to flow out; and providing a light source such that light emitted by the light source is capable of irradiating on an outlet of the nozzle and thereabove.

In the simulating method, the low-pressure region is generated by the Venturi effect.

Compared with the prior art, the present invention has the following advantages: since only one guiding air flow is needed to guide the mist inside the mist generating chamber out, the flame simulating device is simple in structure and convenient to mount; the guiding air flow attracts and adsorbs the mist in the mist generating chamber to come out, and the guiding air flow cannot directly enter the mist generating chamber or disturb the flow direction of the mist, so that the flow direction of the mist is controllable and uniform; and the mist is isolated from electrical components such as the light source to protect the electrical components from being corroded and damaged by the mist, so the present invention is suitable for most flame simulating devices.

Figure 1:
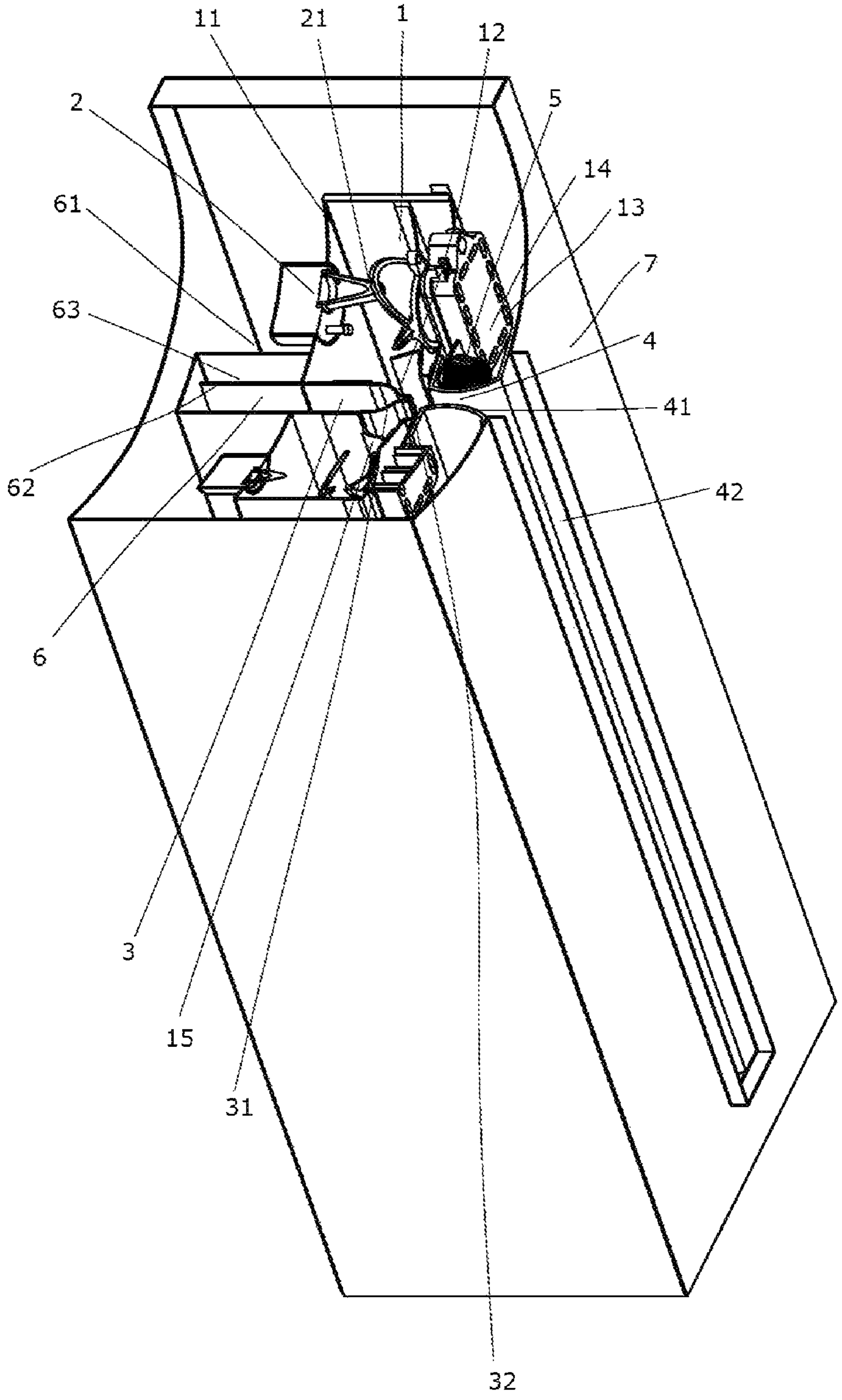
FIG. 1 is a three-dimensional schematic view showing a partial cross-section of the flame simulating device according to Embodiment 1 of the present invention.
Figure 2:
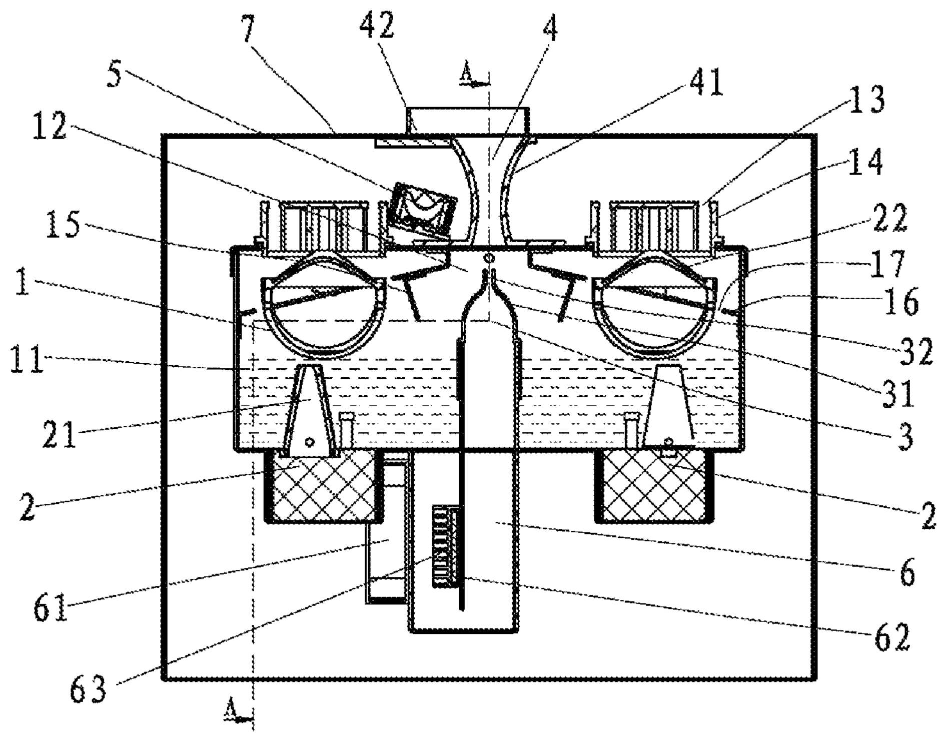
FIG. 2 is a schematic view showing a half cross-sectional structure of the flame simulating device according to Embodiment 1 of the present invention.
Figure 3:
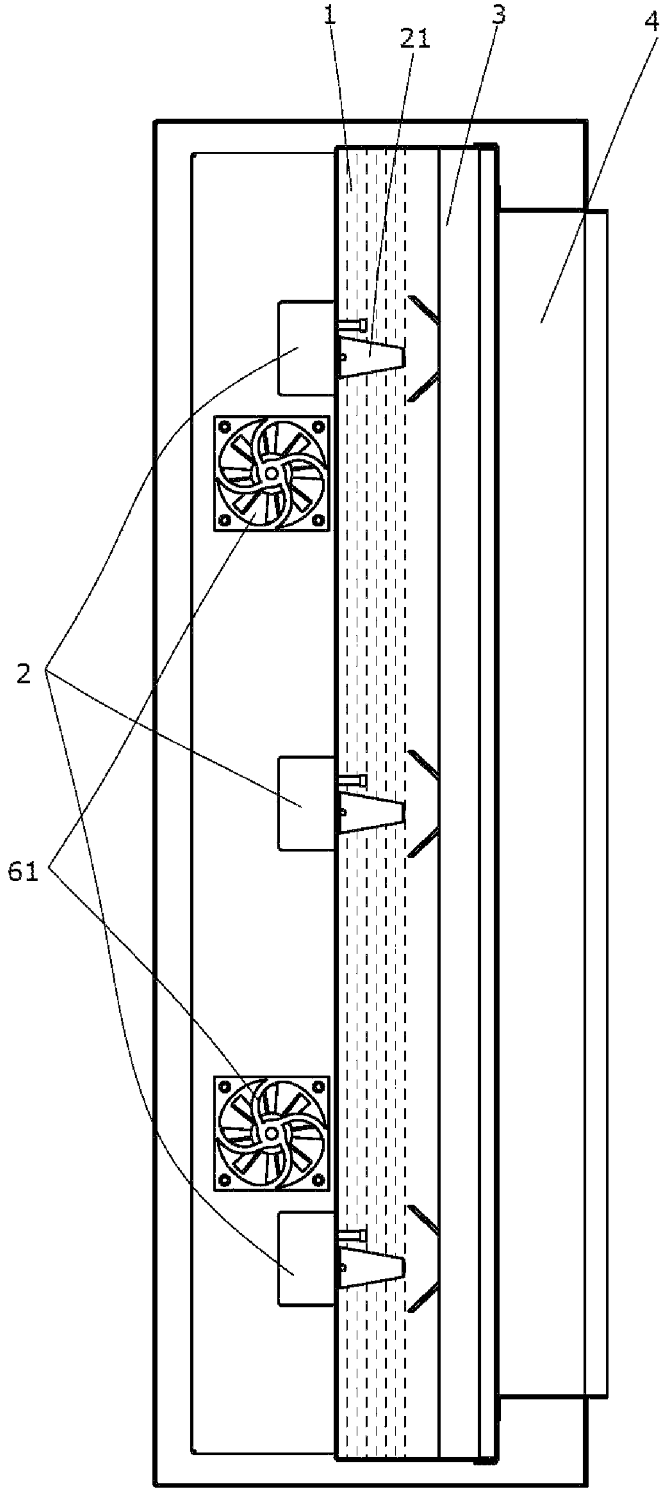
FIG. 3 is a schematic view showing the A-A staircase cross-sectional structure of the flame simulating device according to Embodiment 1 of the present invention.
Figure 4:
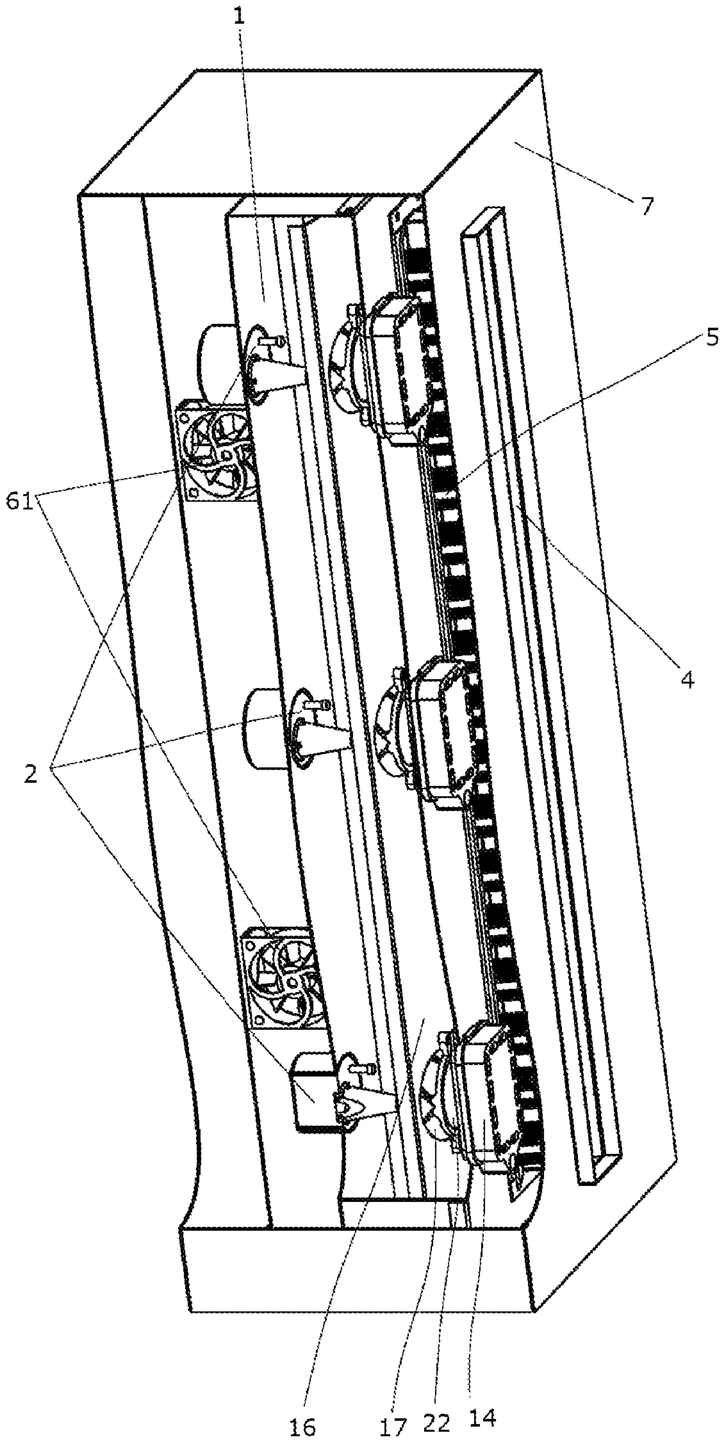
FIG. 4 is a schematic view showing a three-dimensional partial cross-section of the flame simulating device according to Embodiment 1 of the present invention from another viewing angle.
Figure 5:
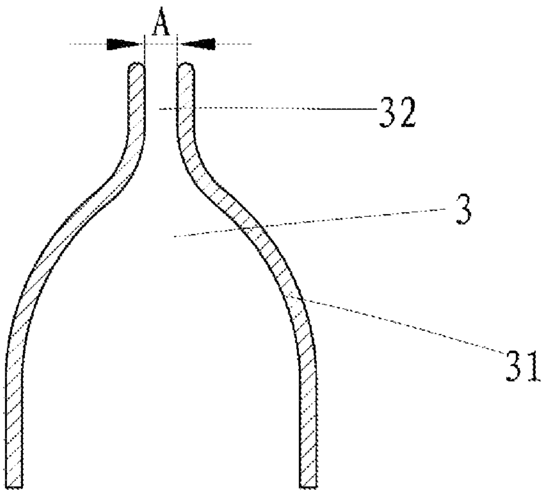
FIG. 5 is a partial enlarged schematic view of the cross section of the air orifice of the flame simulating device according to Embodiment 1 of is the present invention.
Figure 6:
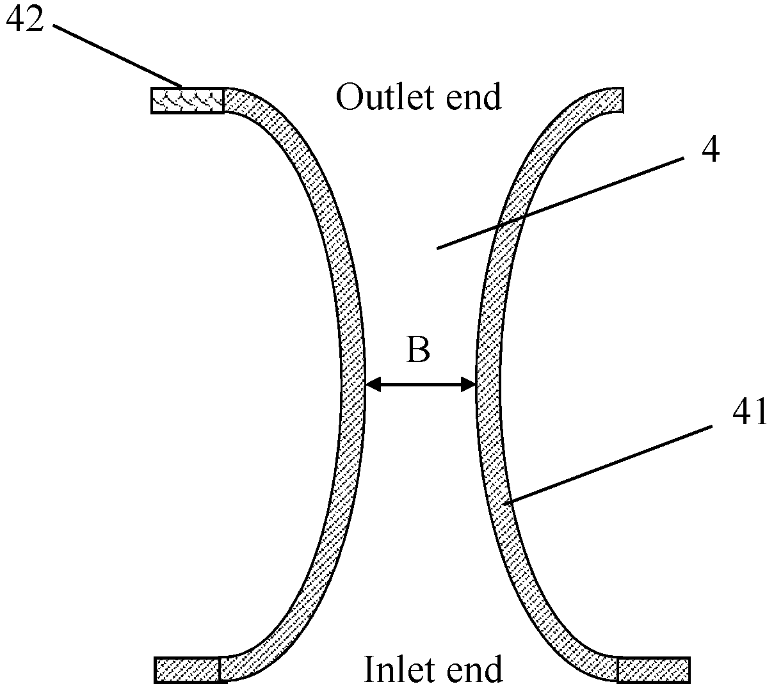
FIG. 6 is a partial enlarged schematic view of the cross section of the nozzle of the flame simulating device according to Embodiment 1 of the present invention.
Figure 7:
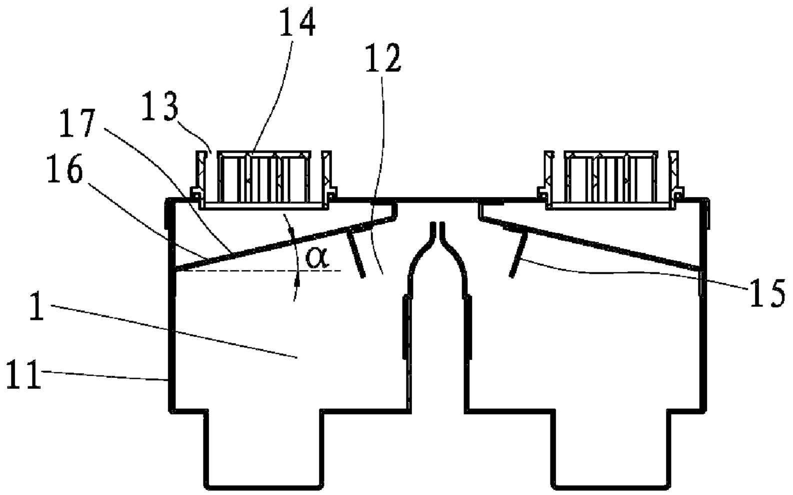
FIG. 7 is a schematic view of a mist generating chamber of the flame simulating device according to Embodiment 1 of the present invention.
Figure 8:
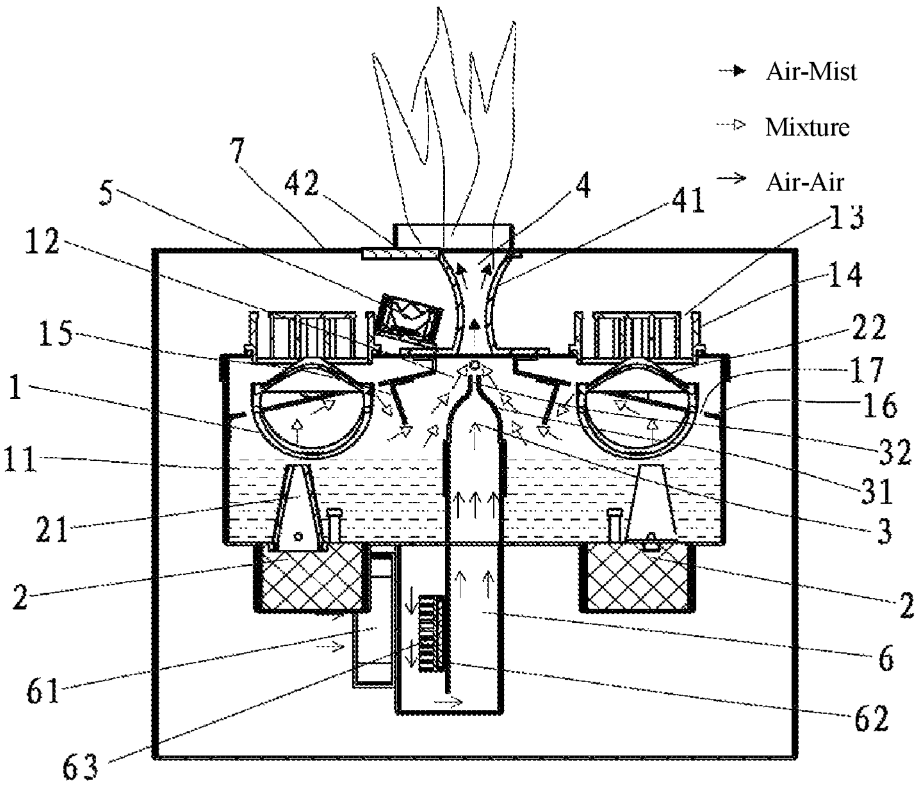
FIG. 8 is a schematic view showing the air flow direction and flame simulation of the flame simulating device according to Embodiment 1 of the present invention.

The names of the components in the figures are: 1—mist generating chamber; 2—atomizing head; 3—air orifice; 4—nozzle; 5—light source; 6—air duct; 7—outer casing; 8—liquid storage tank; 9—simulated fuel bed; 10—liquid level gauge; 20—fireplace cabinet; 30—decorative frame; 11—mist generating chamber housing; 12—mist outlet; 13—breathing port; 14—operation cover; 15—water retaining plate; 16—inclined plane; 17—via hole; 21—energy gathering cover; 22—water retaining shield; 31—air orifice wall; 32—air nozzle; 41—nozzle wall; 42—transparent cover; 61—fan; 62—spoiler; 63—heating element; 81—liquid storage tank liquid level gauge; 91—ash bed 92—simulated solid fuel; 201—heated air orifice device; 93—pebbles; 911—flame outlet; 912—ash bed light source; 921—simulated solid fuel light source.

Particular Embodiments

The utility model will be further described in detail below with reference to the embodiments of the drawings.

Embodiment 1

As shown in FIG. 1 to FIG. 8, a flame simulating device includes a mist generating chamber 1, an atomizing head 2, an air orifice 3 and a nozzle 4. The flame simulating device further includes a light source 5 and a transparent cover 42. The nozzle 4 is elongated in the longitudinal direction and is defined by nozzle walls 41 with Coanda curved surface shapes on both sides. The Coanda surface in this embodiment is an arc-shaped curved surface. The minimum dimension B of the nozzle walls 41 on both sides of the cross section of the nozzle 4 is preferably 2 mm to 20 mm, and the dimension shown in this embodiment is about 5 mm. The air orifice 3 is disposed below the nozzle 4. In this embodiment, the dimension of the air orifice 4 in the longitudinal direction is slightly longer than the length dimension of the nozzle 4, and the air orifice 3 is defined by air orifice walls 31 on both sides. The cross-sectional shape of the air orifice 3 is a flared, triangular or trapezoidal shape with a gentle and smooth transition, and the top of the air orifice 3 is constricted into an air nozzle 32. The width dimension A of the air nozzle 32 at the cross section of the air orifice 3 is preferably 0.5 mm to 6 mm and is about 2 mm in this embodiment as shown. The inner surfaces of the air orifice walls 31 and the nozzle walls 41 are all smooth surfaces. In Embodiment 1, the mist generating chamber 1 is symmetrically disposed on both sides of the air orifice, and the mist generating chamber 1 is defined by a region surrounded by the mist generating chamber housing 11. The mist generating chamber 1 is provided with a mist outlet 12 along the longitudinal direction of the nozzle 4, and the mist outlet 12 communicates with the nozzle 4. The mist outlet 12 is defined by a region between the air orifice walls 31 and the mist generating chamber housing 11, and the air flow provided by the air nozzle 32 is blown upward to flow along the direction of the mist outlet 12 and into an inlet end of the nozzle 4. The atomizing head 2 is an atomizing head made by the principle of ultrasonic high-frequency oscillation. In this embodiment, the resonant frequency of the atomizing head is about 2.4 MHz. The atomizing heads 2 are symmetrically arranged on both sides of the mist generating chamber 1 in the longitudinal direction. In this embodiment, both sides of the mist generating chamber 1 are respectively provided with three atomizing heads 2, so that the generated mist is more uniform in the longitudinal direction. The upper surface of the mist generating chamber 1 corresponding to a position directly above each atomizing head 2 is provided with an operation cover 14, a breathing port 13 is formed in the operation cover 14, and an atomizing nozzle of the atomizing head 2 is provided with an energy gathering cover 21, a water retaining shield 22 is arranged above the energy gathering cover 21, and the water retaining shield 22 is fixed to an inclined plane 16 on the upper portion inside the mist generating chamber 1. In this embodiment, an included angle ∠α between the inclined plane 16 and the horizontal plane is about 12 degrees, a via hole 17 is formed in a position of the inclined plane 16 corresponding to the water retaining shield 22, and there is a gap allowing the air flow to pass between the via hole 17 and the water retaining shield 22. A liquid is further provided in the mist generating chamber 1, and in Embodiment 1, the liquid is water. The liquid level is a certain height over the atomizing head 2 but may be a certain distance below or above the outlet of the energy gathering cover 21. Inside the mist generating chamber 1, a water retaining plate 15 is further disposed before the mist outlet 12. The light source 5 is disposed obliquely below the nozzle 4. In Embodiment 1, the light source 5 is disposed only on one side of the nozzle 4, the light emitted by the light source 5 irradiates upward on the outlet of the nozzle 4 and thereabove, and at least the nozzle wall 41 adjacent to one side of the light source 5 is made of a transparent material. The transparent cover 42 is disposed on the nozzle wall 41 on the side adjacent to the light source 5 and seals the opening region between the upper end outlet of the nozzle 4 and the outer casing 7, and in this embodiment, the transparent cover 42 and the nozzle wall are integrated. An air duct 6 is further disposed below the air orifice 3, and the air duct 6 is also elongated and is disposed along the longitudinal direction of the air orifice 3. The air duct 6 provides a guiding air flow blown upward to the air orifice 3 by a fan 61. A plurality of fans 61 may be disposed according to the length dimension, and there are two fans 61 in this embodiment. The inside of the air duct 6 is further provided with a spoiler 62, and the disturbance of the spoiler 62 may cause the air force provided by the fan 61 to be more uniformly distributed in the air duct 6 along the longitudinal direction. The inside of the air duct 6 is further provided with a heating element 63, and the heating element 63 is mounted on a side of the spoiler 62 facing the fan 61. The heating element 63 can heat the guiding air flow provided by the fan 61, so that the air with air force in the air duct is hot air. In addition, the operation cover and the water retaining shield are both detachable, and the atomizing head is disposed in a groove at the bottom inside the mist generating chamber. When the atomizing head is out of order and needs to be repaired, the atomizing head can be easily replaced by dismantling the operation cover and the water retaining shield.

During operation, the atomizing head 2 is energized to atomize the liquid, and the mist is collected above the liquid level of the mist generating chamber 1. The fan 61 is energized to generate an air force, and the air force is subjected to the action of the spoiler 62 to be uniformly blown into the air duct 6 along the longitudinal direction, thereby entering the air orifice 3. The cross-sectional shape of the air orifice 3 is a flared, triangular or trapezoidal shape that is constricted with a gentle and smooth transition, and thus, has a further converging and guiding effect on the air flow in the air duct 6, and the air flow is blown out from the air nozzle 32 uniformly and vertically upward in the longitudinal direction. Since the heating element 63 heats the air in the air duct 6, the air blown into the air orifice 3 is hot air, and the air blown out from the air nozzle 32 is also hot air. Since the nozzle 4 is disposed above the air nozzle 32, the hot air blown from the air nozzle 32 directly enters the lower end inlet of the nozzle 4. In the mist generating chamber 1, in the region adjacent to the mist outlet 12, due to the flow of the air blown from the air nozzle 32, a low pressure is formed in this region, and the outlet of the air nozzle 32 provides an air flow along the direction of the mist outlet 12. Under the Venturi effect, the air flow blown by the air nozzle 32 has an adsorption effect on the mist outlet 12, so that the mist in the mist generating chamber 1 is attracted to flow to this region through the mist outlet 12, and the mist from the mist outlet 12 and the guiding air flow from the air nozzle 32 form an air-mist mixture to enter the lower end inlet of the nozzle 4 together. Since the nozzle walls 41 on both sides of the nozzle 4 are set as the Coanda surfaces, according to the principle of the Coanda Effect (also referred to as the wall-attachment effect), as long as the curvature is not large, the fluid will flow along the surface of the object, that is, away from the original flow direction, but flow along the surface of the convex object. It can be known that the air-mist mixture entering the inlet end of the nozzle 4 will flow along the surface of the nozzle wall 41, thereby the air-mist mixture is expanded, and slowly flutters upward out of the upper end outlet of the nozzle 4. Since the air-mist mixture has a certain amount of heat and is hotter than the surrounding space, according to the thermodynamic principle, the air-mist mixture has the power to continue to flutter upward under the thermodynamic effect, so that the air-mist mixture flutters higher. The light source 5 disposed obliquely below the nozzle 4 is energized to emit light irradiating upward, and since at least the nozzle wall 41 adjacent to one side of the nozzle 4 and the transparent cover 42 are made of a transparent material, the light emitted by the light source 5 can penetrate the nozzle wall 41 and the transparent cover 42, irradiate on the upper end outlet of the nozzle 4 and thereabove, and then continue to irradiate on the air-mist mixture slowly fluttering out from the upper end outlet of the nozzle 4. During the upward fluttering of the air-mist mixture, various ascending shapes are formed, and under the action of the light irradiation, an effect similar to the shapes of leaping flames is created, thereby simulating the flame combustion state. Since the nozzle 4 is elongated, a burning flame in the longitudinal direction is formed. The light emitted by the light source 5 may be monochromatic, preferably yellow or amber, or may be polychromatic.

Since the transparent cover 42 seals a region between the opening on the outer casing 7 and the nozzle 4, the mist fluttering out of the nozzle 4 cannot enter the inside of the flame simulating device, thereby protecting the electrical elements inside the flame simulating device. Since the mist in the mist generating chamber 1 flows toward the mist outlet 12, the air pressure in the entire mist generating chamber 1 is lowered, at this time, outside air will supplement the air pressure inside the mist generating chamber 1 through the breathing port 13 in time. Moreover, the breathing port 13 is located above the atomizing head 2 and the supplementary air flow entering the mist generating chamber 1 through the breathing port 13 will directly act on the mist and the mist flows towards the mist outlet 12 under the guiding of the inclined plane 16. Moreover, the water retaining shield 22 is arranged so that larger-particle water drops generated in the atomizing head 2cannot go so far as to rush out of the breathing port 13, which ensures that the liquid is confined in the mist generating chamber 1.

Embodiment 2

Figure 9:
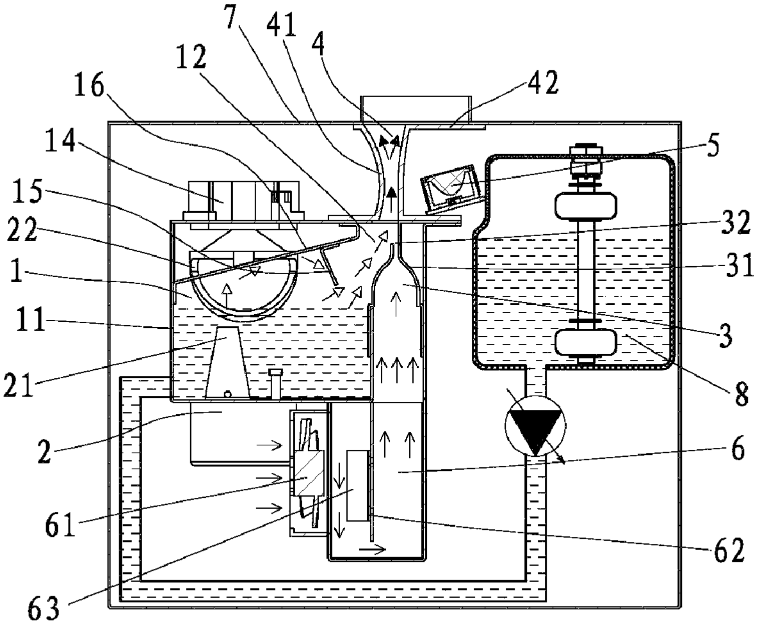
FIG. 9 is a schematic view showing a half cross-sectional structure of the flame simulating device according to Embodiment 2 of the present invention.
Figure 10:
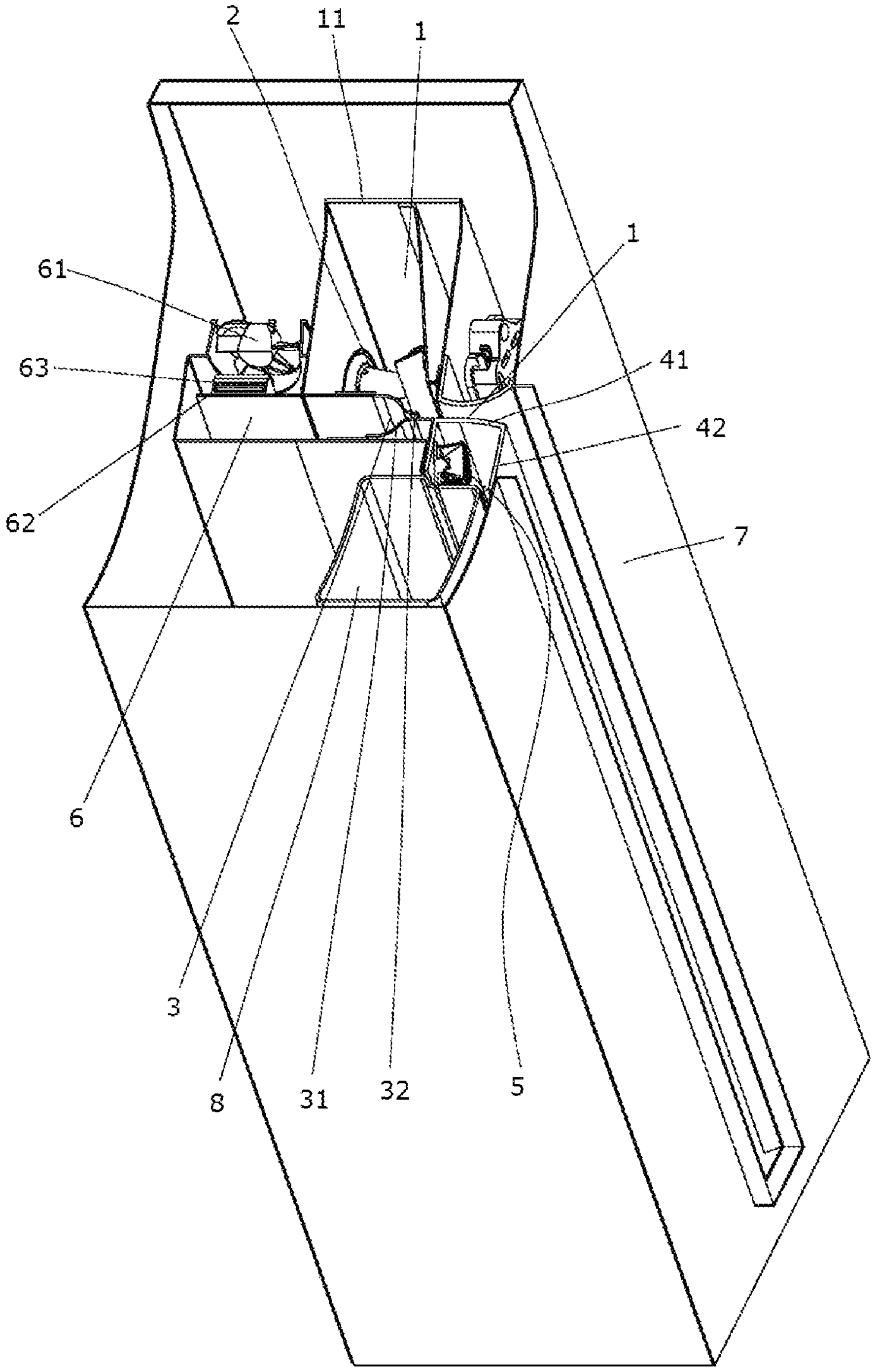
FIG. 10 is a three-dimensional schematic view showing a partial cross-section of the flame simulating device according to Embodiment 2 of the present invention.
Figure 11:
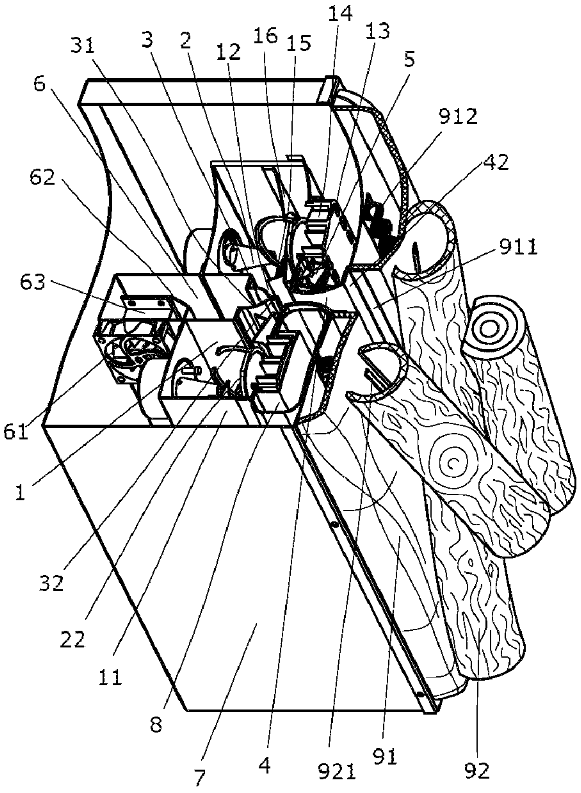
FIG. 11 is a three-dimensional schematic view showing a partial cross-section of the atomizing simulation fireplace according to Embodiment 3 of the present invention.
Figure 12:
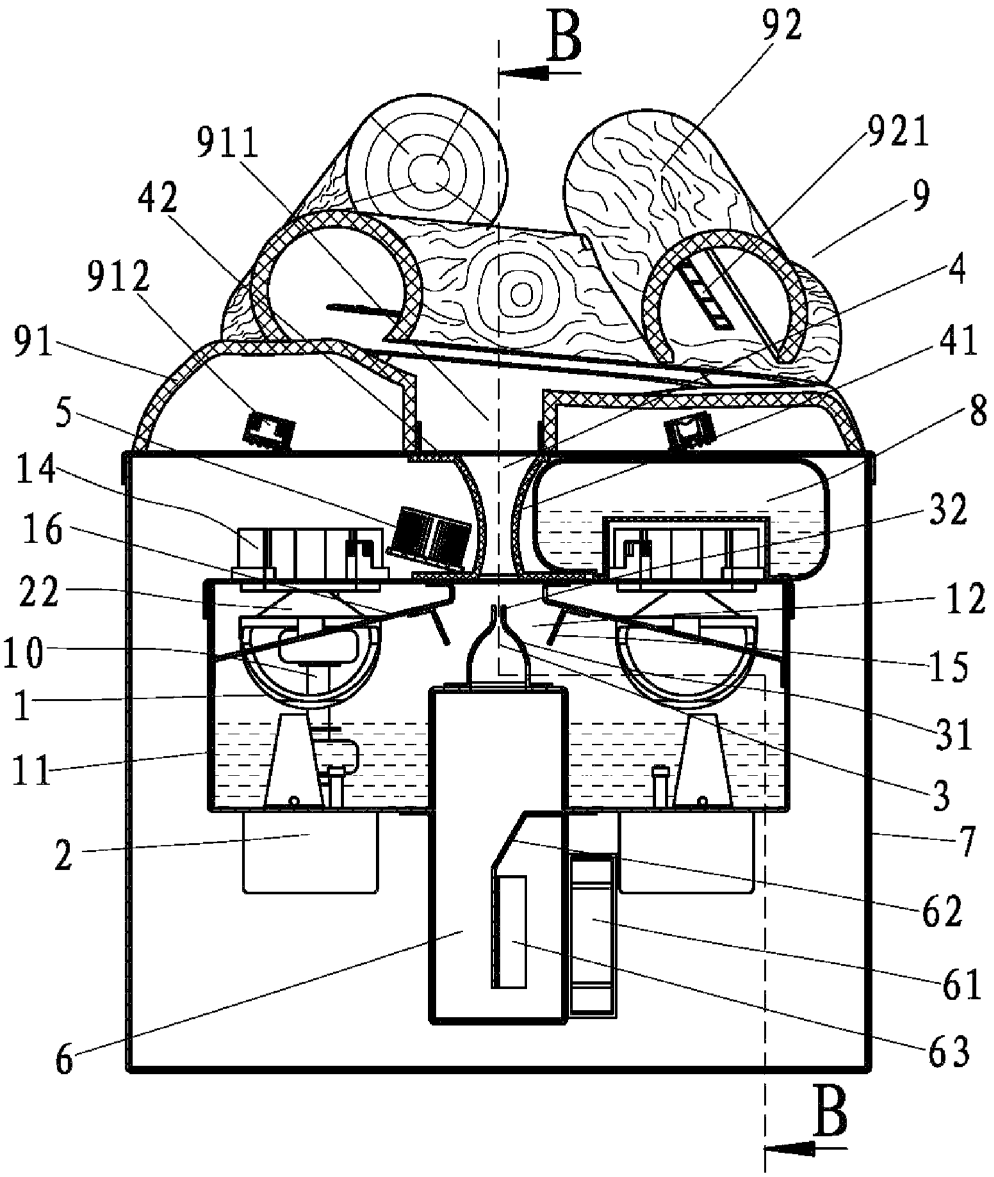
FIG. 12 is a schematic view showing a half cross-sectional structure of the cross section of the flame simulating device according to Embodiment 3 of the present invention.
Figure 13:
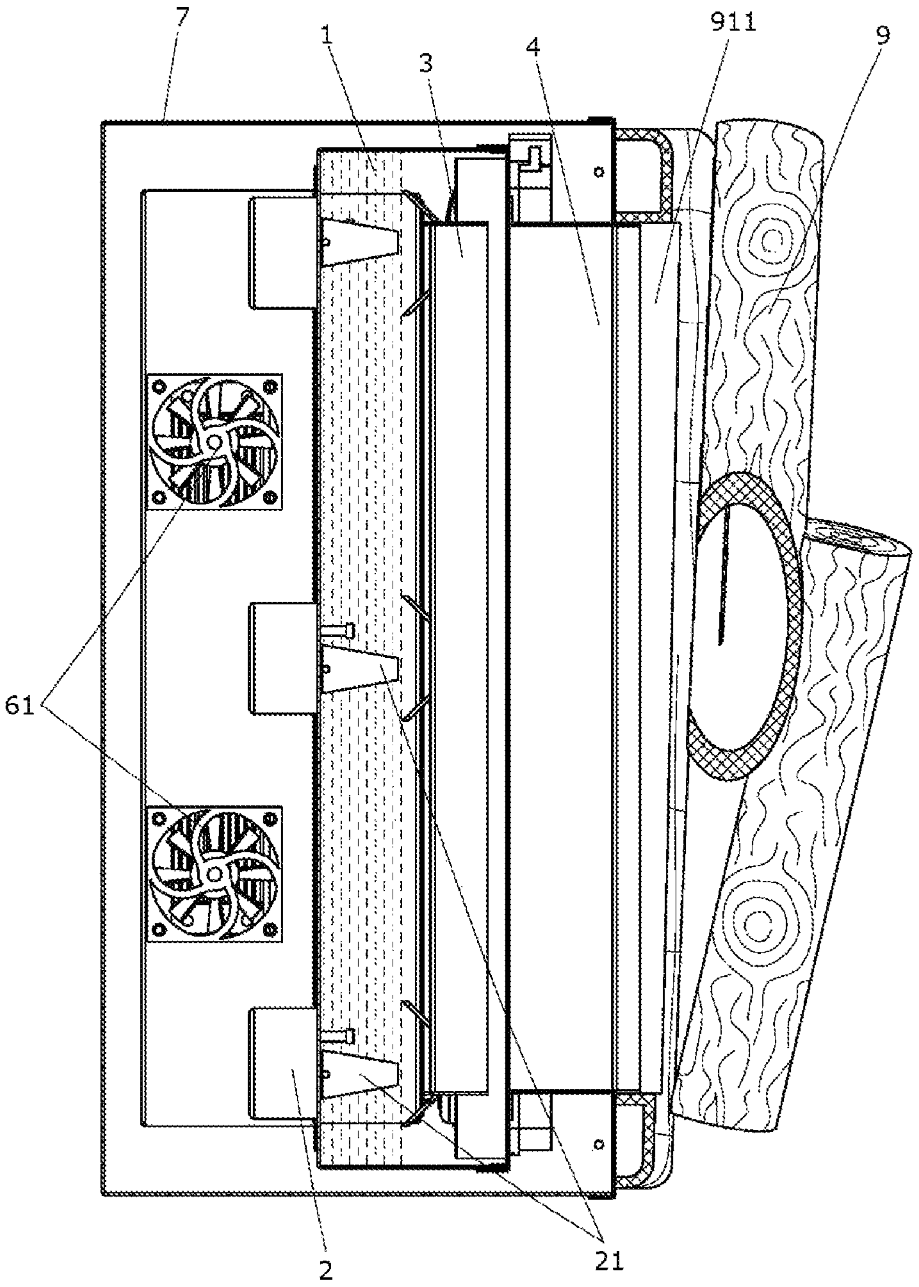
FIG. 13 is a schematic view showing the B-B staircase cross-sectional structure of the position of the atomizing simulation fireplace according to Embodiment 3 of the present invention.
Figure 14:
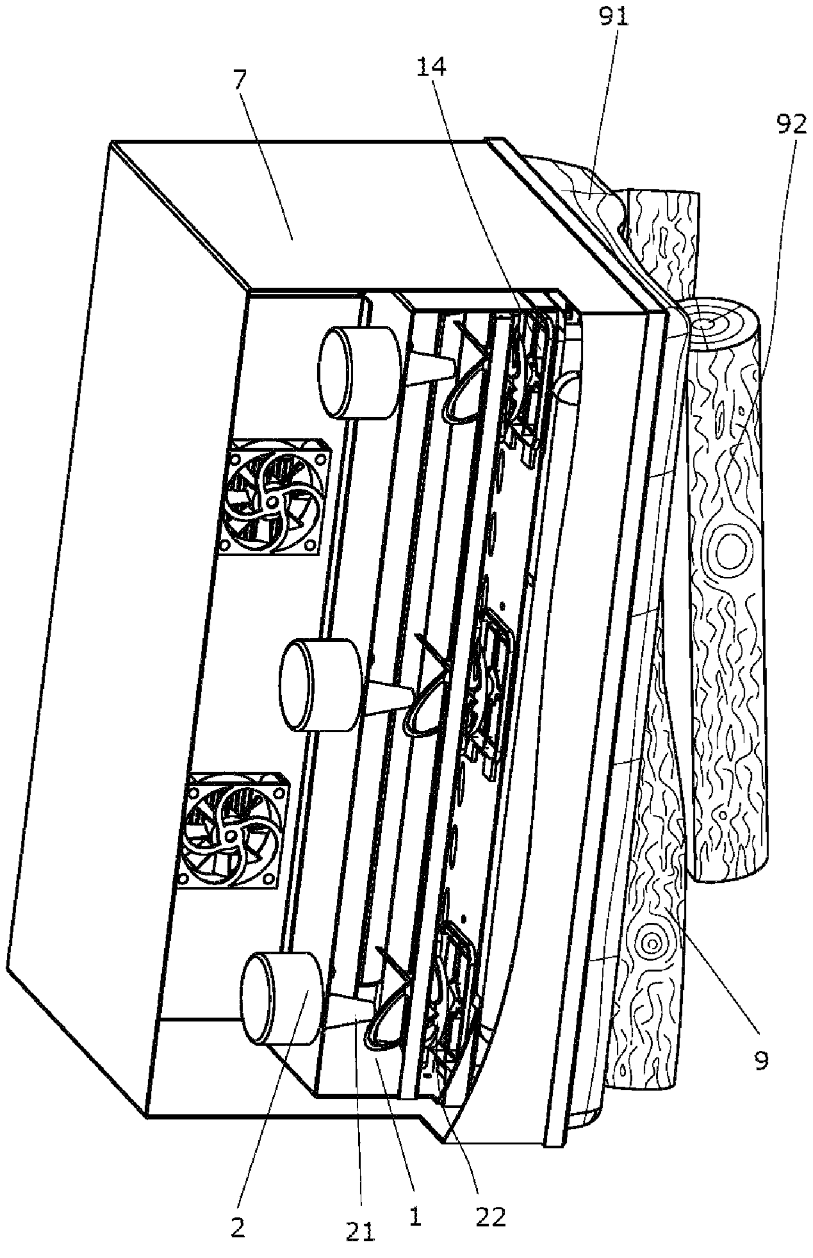
FIG. 14 is a three-dimensional schematic view showing a partial cross-section of the atomizing simulation fireplace according to Embodiment 3 of the present invention from another viewing angle.
Figure 15:
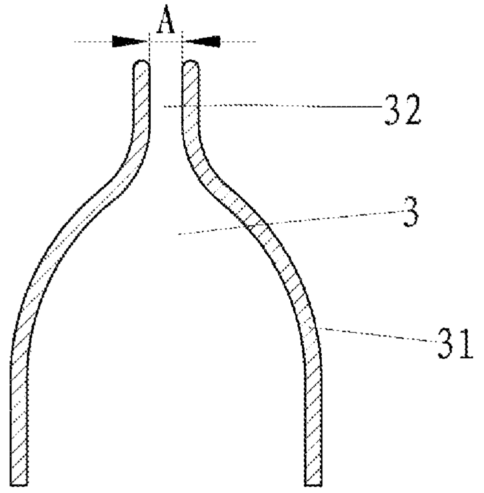
FIG. 15 is a partial enlarged schematic view of the cross section of the air orifice of the atomizing simulation fireplace according to Embodiment 3 of the present invention.
Figure 16:
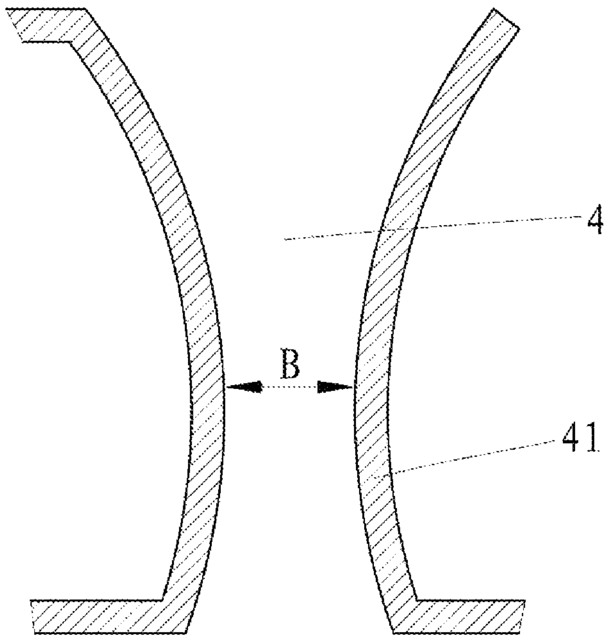
FIG. 16 is a partial enlarged schematic view of the cross section of the nozzle of the atomizing simulation fireplace according to Embodiment 3 of the present invention.
Figure 17:
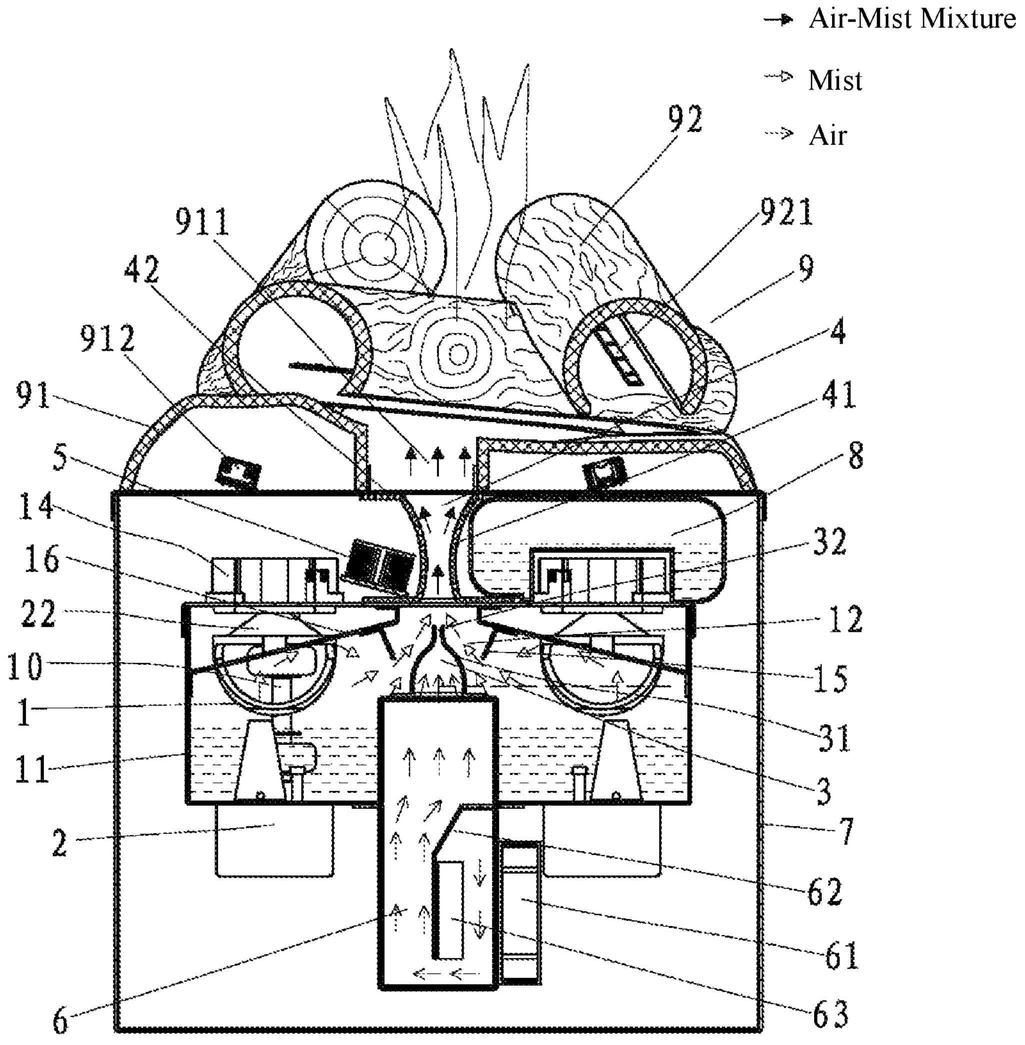
FIG. 17 is a schematic view showing the air flow direction and flame simulation of the atomizing simulation fireplace according to Embodiment 3 of the present invention.
Figure 18:
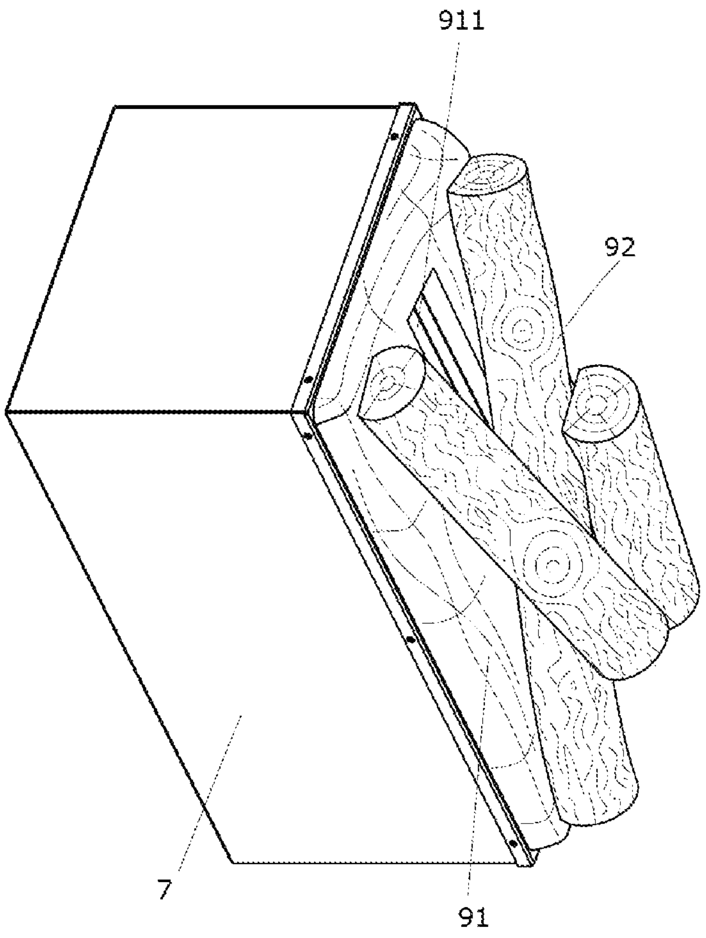
FIG. 18 is a three-dimensional schematic view showing the structure of the atomizing simulation fireplace according to Embodiment 3 of the present invention.
Figure 19:
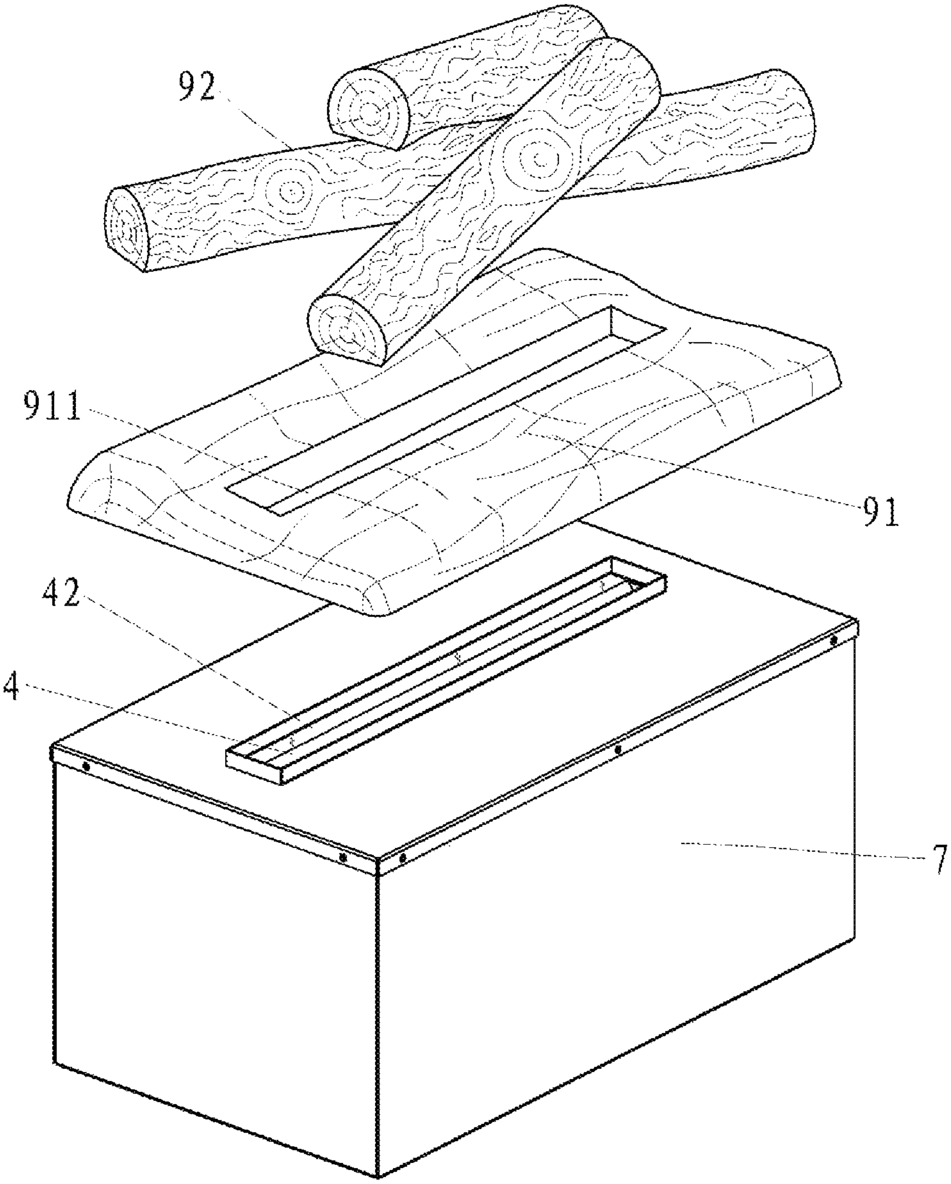
FIG. 19 is an exploded schematic view showing the structure of the atomizing simulation fireplace according to Embodiment 3 of the present invention.

A flame simulating device is shown in FIG. 9 to FIG. 10. In Embodiment 2, compared with Embodiment 1, the mist generating chamber 1 is arranged on a single side with respect to the air orifice 3 and the nozzle 4, only one nozzle wall 41 is a Coanda curved surface, and the light source 5 is arranged on the other side with respect to the mist generating chamber 1.

The mist generating chamber 1 is disposed only on one side of the air orifice 3, thereby saving the space, facilitating mounting and increasing the volume of the liquid storage tank 8.

Embodiment 3

As shown in FIG. 11 to FIG. 19, an atomizing simulation fireplace includes a mist generating chamber 1, an atomizing head 2, an air orifice 3, a nozzle 4, a light source 5, an outer casing 7 and a simulated fuel bed 9. The nozzle 4 is elongated in the longitudinal direction and is defined by nozzle walls 41 with Coanda curved surface shapes on both sides. The Coanda surface in this embodiment is an arc-shaped curved surface. The minimum dimension B of the nozzle walls 41 on both sides of the cross section of the nozzle 4 is preferably 2 mm to 20 mm, and the dimension shown in this embodiment is about 5 mm. The air orifice 3 is disposed below the nozzle 4. In this embodiment, the dimension of the air orifice 4 in the longitudinal direction is slightly longer than the length dimension of the nozzle 4, and the air orifice 3 is defined by air orifice walls 31 on both sides. The cross-sectional shape of the air orifice 3 is a flared shape with a gentle and smooth transition, and the top of the air orifice 3 is constricted into an air nozzle 32. The width dimension A of the air nozzle 32 at the cross section of the air orifice 3 is preferably 0.5 mm to 6 mm and is about 2 mm in this embodiment as shown. The inner surfaces of the air orifice walls 31 and the nozzle walls 41 are all smooth surfaces. In this embodiment, the mist generating chamber 1 is symmetrically disposed on both sides of the air orifice, and the mist generating chamber 1 is defined by a region surrounded by the mist generating chamber housing 11. The mist generating chamber 1 is provided with a mist outlet 12 along the longitudinal direction of the nozzle 4, and the mist outlet 12 communicates with the nozzle 4. The mist outlet 12 is defined by a region between the air orifice walls 31 and the mist generating chamber housing 11, and the air flow provided by the air nozzle 32 is blown upward into an inlet end of the nozzle 4 along the mist outlet 12. The atomizing head 2 is an atomizing head made by the principle of ultrasonic oscillation, and the atomizing heads 2 are symmetrically arranged on both sides of the mist generating chamber 1 along the longitudinal direction. In this embodiment, both sides of the mist generating chamber 1 are respectively provided with three atomizing heads 2, so that the generated mist is more uniform along the longitudinal direction. The upper surface of the mist generating chamber 1 corresponding to a position directly above each atomizing head 2 is provided with an operation cover 14, a breathing port 13 is formed in the operation cover 14, and an atomizing nozzle of the atomizing head 2 is provided with an energy gathering cover 21. A water retaining shield 22 is arranged above the energy gathering cover 21, and the water retaining shield 22 is fixed to an inclined plane 16 on the upper portion inside the mist generating chamber 1. In this embodiment, an included angle $\angle\alpha$ between the inclined plane and the horizontal plane is about 12 degrees, a via hole 17 is formed in a position of the inclined plane 16 corresponding to the water retaining shield 22, and there is a gap allowing the air flow to pass between the via hole 17 and the water retaining shield 22. A liquid is further disposed in the mist generating chamber 1, and in Embodiment 1, the liquid is water. The liquid is at a certain height above the atomizing head 2 but may be a certain distance below or above the outlet of the energy gathering cover 21. Inside the mist generating chamber 1, a water retaining plate 15 is further disposed before the mist outlet 12. The light source 5 is disposed right below or obliquely below the nozzle 4, or on one side or both sides, and the light emitted by the light source 5 may be monochromatic, preferably yellow or amber, or may be polychromatic. At least the nozzle wall 41 adjacent to one side of the light source 5 is made of a transparent material. The transparent cover 42 is disposed on the nozzle wall 41 on the side adjacent to the light source 5 and seals the opening region between the upper end outlet of the nozzle 4 and the outer casing 7, and in this embodiment, the transparent cover 42 and the nozzle wall are integrated. In addition, the operation cover and the water retaining shield are both detachable, and the atomizing head is disposed in a groove at the bottom inside the mist generating chamber. When the atomizing head is out of order and needs to be repaired, the atomizing head can be easily replaced by dismantling the operation cover and the water retaining shield.

The mist generating chamber 1, the atomizing head 2, the air orifice 3, the nozzle 4 and the light source 5 are all disposed inside the outer casing 7, and the outlet of the nozzle 4 communicates with the outside of the upper surface of the outer casing 7. In this embodiment, the simulated fuel bed 9 is composed of an ash bed 91 and a simulated solid fuel 92 and is disposed on the upper surface of the outer casing 7. The ash bed 91 is provided with a flame outlet 911 in the longitudinal direction corresponding to the outlet position of the nozzle 4. The simulated solid fuel 92 is placed over the ash bed 91 in a cross manner. The light emitted from the light source 5 can irradiate on the outlet of the flame outlet 911 and thereabove. Both the ash bed 91 and the simulated solid fuel 92 are made of a translucent material. An ash bed light source 912 is disposed inside the ash bed, and a simulated solid fuel light source 921 is disposed inside the simulated solid fuel 92. The ash bed light source 912 can make the ash bed 91 to be self-luminous to simulate the state of residual fire combustion of ash, and the simulated solid fuel 921 can make the simulated solid fuel 92 to be self-luminous to simulate the state of real solid fuel combustion.

An air duct 6 is further disposed below of air orifice 3, and the air duct 6 is also elongated and is disposed along the longitudinal direction of the air orifice 3. The air duct 6 provides a guiding air flow blown upward to the air orifice 3 by a fan 61. A plurality of fans 61 may be disposed according to the length dimension, and there are two fans 61 in this embodiment. The inside of the air duct 6 is further provided with a spoiler 62, and the disturbance of the spoiler 62 may cause the air force provided by the fan 61 to be more uniformly distributed in the air duct 6 along the longitudinal direction. The inside of the air duct 6 is further provided with a heating element 63, and the heating element 63 is mounted on a side of the spoiler 62 facing the fan 61. The heating element 63 can heat the guiding air flow provided by the fan 61, so that the air with air force in the air duct 6 is hot air.

A liquid level gauge 10 is further disposed in the mist generating chamber 1 for detecting whether the liquid level in the mist generating chamber 1 is within the liquid level range required for the operation of the atomizing head 2. A liquid storage tank 8 is provided near the mist generating chamber 1 for storing the standby liquid supplied to the mist generating chamber 1. Preferably, in Embodiment 1, the lowest water level of the liquid storage tank 8 is higher than the highest water level allowed by the mist generating chamber 1.

During operation, the atomizing head 2 is energized to atomize the liquid, and the mist is collected above the liquid level of the mist generating chamber 1. The fan 61 is energized to generate an air force, and the air force is subjected to the action of the spoiler 62 to be uniformly blown into the air duct 6 along the longitudinal direction, thereby entering the air orifice 3. The cross-sectional shape of the air orifice 3 is a flared constricted shape with a gentle and smooth transition, and thus, has a further converging and guiding effect on the air flow in the air duct 6, and the air flow is blown out from the air nozzle 32 uniformly and vertically upward in the longitudinal direction. Since the heating element 63 heats the air in the air duct 6, the air blown into the air orifice 3 is hot air, and the air blown out from the air nozzle 32 is also hot air. Since the nozzle 4 is disposed above the air nozzle 32, the hot air blown from the air nozzle 32 directly enters the lower end inlet of the nozzle 4. In the mist generating chamber 1, in the region adjacent to the mist outlet 12, due to the flow of the air blown from the air nozzle 32, a low pressure is formed in this region, and the outlet of the air nozzle 32 provides an air flow moving along the direction of the mist outlet 12. Under to the Venturi effect, the air flow blown by the air nozzle 32 has an adsorption effect on the mist outlet 12, so that the mist in the mist generating chamber 1 is attracted to flow to this region through the mist outlet 12, and the mist from the mist outlet 12 and the guiding air flow from the air nozzle 32 form an air-mist mixture to enter the lower end inlet of the nozzle 4 together. Since the nozzle walls 41 on both sides of the nozzle 4 are set as the Coanda surfaces, according to the principle of the Coanda Effect (also referred to as the wall-attachment effect), as long as the curvature is not large, the fluid will flow along the surface of the object, that is, away from the original flow direction, but flow along the surface of the convex object. It can be known that the air-mist mixture entering the inlet end of the nozzle 4 will flow along the surface of the nozzle wall 41, thereby the air-mist mixture is expanded, and gradually flutters upward out of the upper end outlet of the nozzle 4. Since the air-mist mixture has a certain amount of heat and is hotter than the surrounding space, according to the thermodynamic principle, the air-mist mixture continues to flutter upward under the thermodynamic effect, and then flutters upward from the gap of the simulated solid fuel 92 through the flame outlet 911. The light source 5 disposed obliquely below the nozzle 4 is energized to emit light irradiating upward, and since at least the nozzle wall 41 adjacent to one side of the nozzle 4 and the transparent cover are made of a transparent material, the light emitted by the light source 5 can penetrate the nozzle wall 41 and the transparent cover, irradiate on the outlet of the flame outlet 911 and thereabove, and then irradiate on the slowly fluttering air-mist mixture. During the upward fluttering of the air-mist mixture, various ascending shapes are formed, and under the action of the light irradiation, an effect similar to the shapes of burning and leaping flames is created around the simulated solid fuel 92 and/or above the ash bed 91, thereby simulating the flame combustion state. Since the nozzle 4 is elongated, a burning flame in the longitudinal direction is formed. The light emitted by the light source 5 may be monochromatic, preferably yellow or amber, or may be polychromatic.

While the light emitted from the light source 5 irradiates on the mist to form the effect of burning and fluttering flame on the simulated fuel bed 9, the ash bed light source 712 inside the ash bed 91 emits light to enable the ash bed 91 to simulate the state of residual fire combustion of ash, and the simulated solid fuel light source 921 inside the simulated solid fuel 92 emits light to enable the simulated solid fuel 92 to simulate the state of real solid fuel combustion, so that the ash bed 91 and the simulated solid fuel 92 complement the mist simulated flame to jointly form the state of flame simulating the real fuel combustion.

Since the transparent cover 42 seals a region between the opening on the outer casing 7 and the nozzle 4, the mist fluttering out of the nozzle 4 cannot enter the inside of the flame simulating device, thereby protecting the electrical elements inside the flame simulating device.

Since the mist in the mist generating chamber 1 flows toward the mist outlet 12, the air pressure in the entire mist generating chamber 1 is lowered. Therefore, a breathing port 13 is disposed in a place where the mist generating chamber 1 is away from the mist outlet 12, and the breathing port 13 is also disposed along the longitudinal direction of the mist generating chamber 1. The inside of the mist generating chamber 1 communicates with the atmosphere through the breathing port 13, so that the inside of the entire mist generating chamber 1 can maintain the same air pressure as the surrounding atmosphere. In order to achieve that a region with a sufficiently-low pressure is not formed in the region near the mist outlet 12, at this time, outside air will supplement the air pressure inside the mist generating chamber 1 through the breathing port 13 in time, and the breathing port 13 is located above the atomizing head 2. The supplementary air flow entering the mist generating chamber 1 through the breathing port 13 will directly act on the mist and the mist flows towards the mist outlet 12 under the guiding of the inclined plane 16. Moreover, the water retaining shield 22 is arranged so that larger-particle water drops generated in the atomizing head 2cannot go so far as to rush out of the breathing port 13, which ensures that the liquid is confined in the mist generating chamber 1.

Embodiment 4

Figure 20:
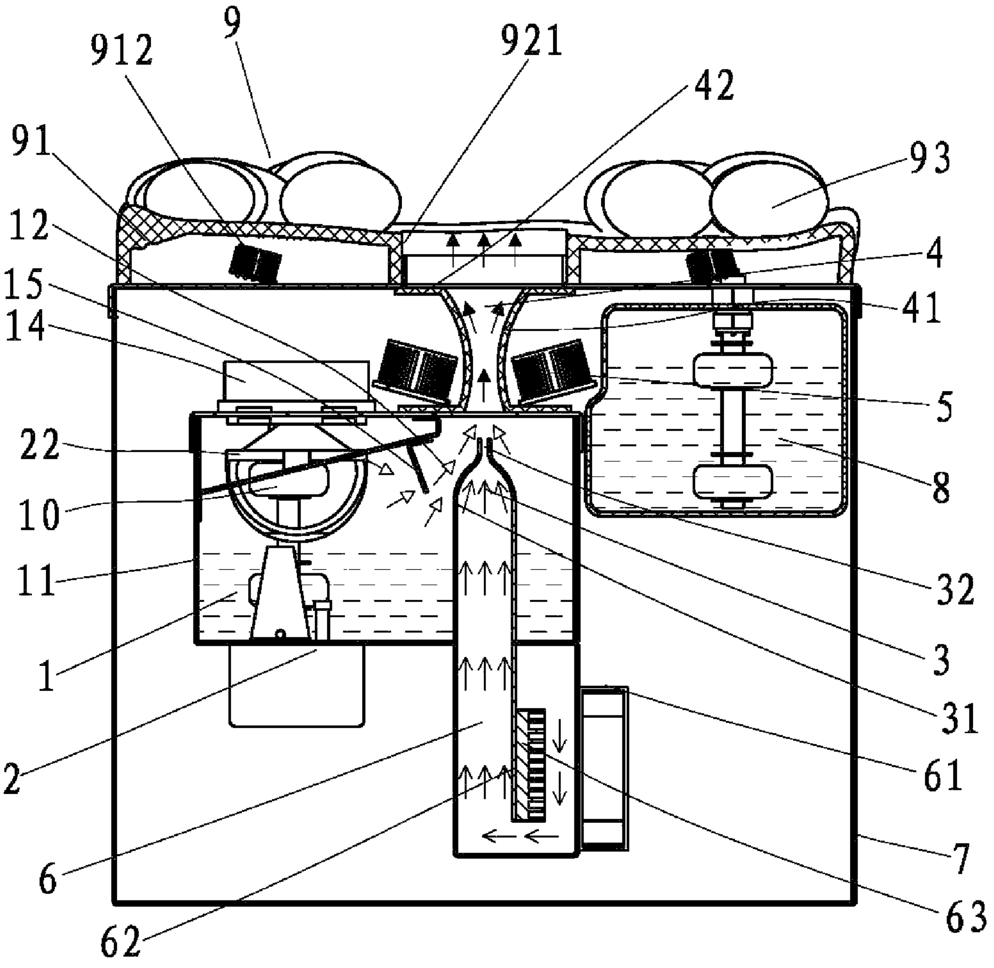
FIG. 20 is a schematic view showing a half cross-sectional structure of the atomizing simulation fireplace according to Embodiment 4 of the present invention.
Figure 21:
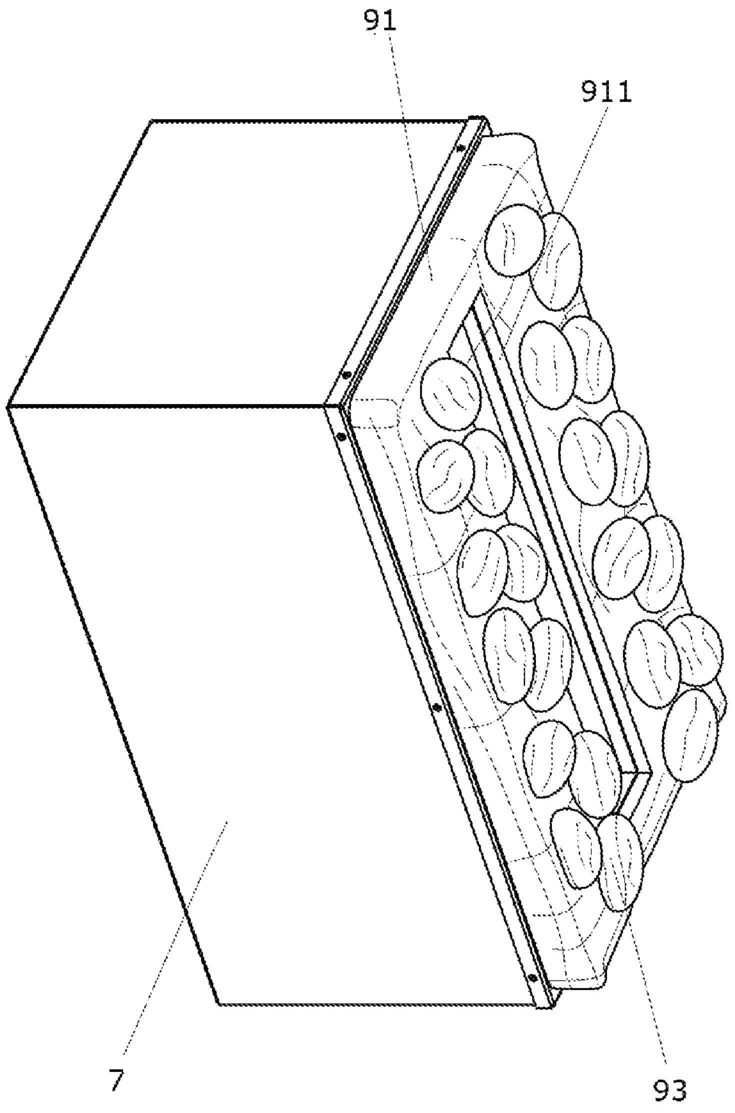
FIG. 21 is a three-dimensional schematic view showing the structure of the atomizing simulation fireplace according to Embodiment 4 of the present invention.

As shown in FIG. 20 to FIG. 21, an atomizing simulation fireplace includes a mist generating chamber 1, an atomizing head 2, an air orifice 3, a nozzle 4, a light source 5, an outer casing 7 and a simulated fuel bed 9. Compared with Embodiment 3, the mist generating chamber 1 is arranged on a single side with respect to the air orifice 3 and the nozzle 4, the light source 5 is arranged on both sides of the nozzle 4, and atomizing heads 2 are also arranged on a single side and arranged in plurality along the longitudinal direction. The mist generating chamber 1 is disposed only on one side of the air orifice 3, thereby saving the space and increasing the volume of the liquid storage tank 8, so that the working time of the fireplace can be longer.

In addition, the simulated fuel bed 9 is composed of an ash bed 91 and pebbles 93. The pebbles 93 are scattered casually on the ash bed 91. After fluttering out of the flame outlet 911, the air-mist mixture simulates the shape of the flame above the pebbles 93.

A liquid storage tank liquid level gauge 81 is disposed in the liquid storage tank 8. The liquid storage tank liquid level gauge 81 monitors the liquid level change in the liquid storage tank 8, so that the user can be promptly reminded to add the liquid used for atomization.

Embodiment 5

Figure 22:
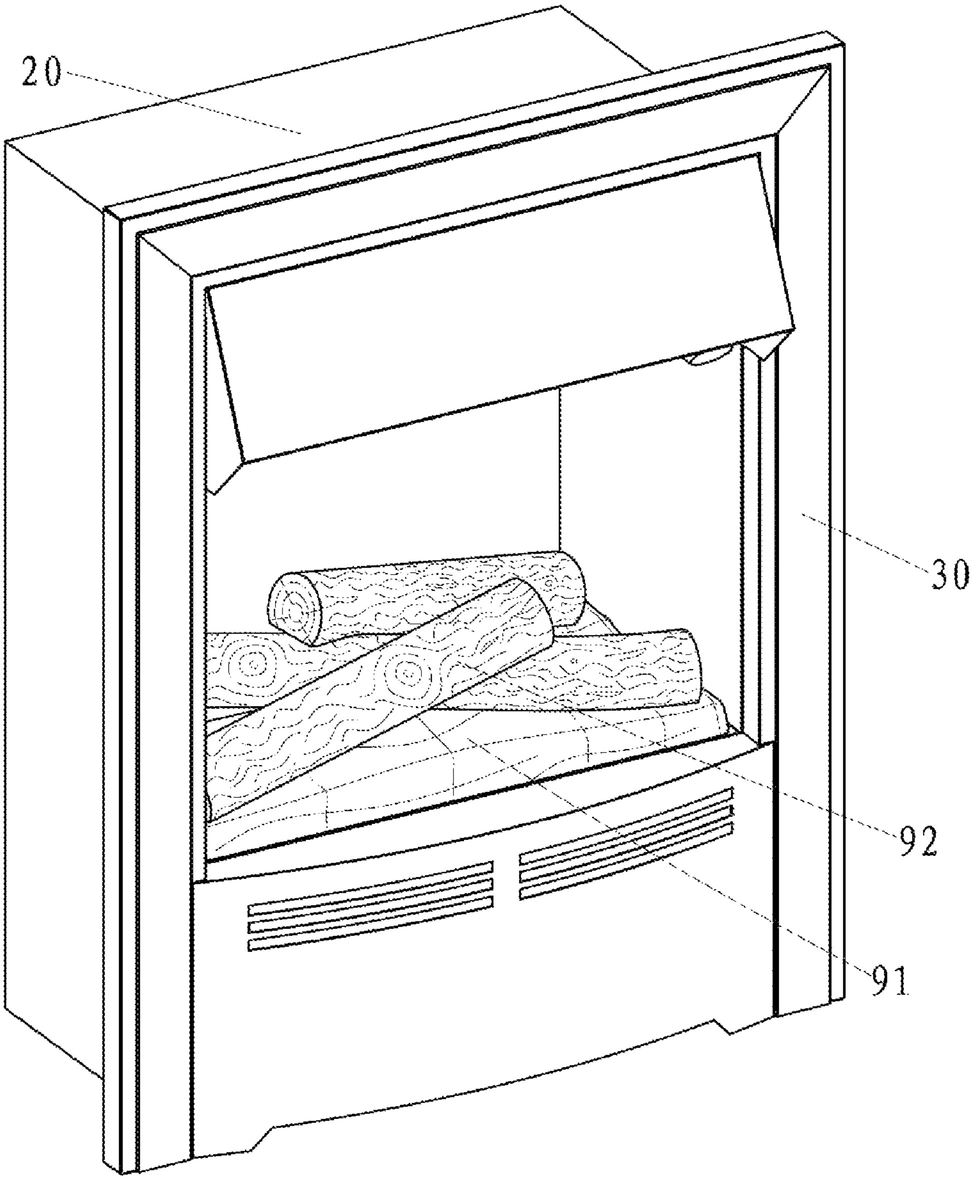
FIG. 22 is a three-dimensional schematic view showing the structure of the atomizing simulation fireplace according to Embodiment 5 of the present invention.
Figure 23:
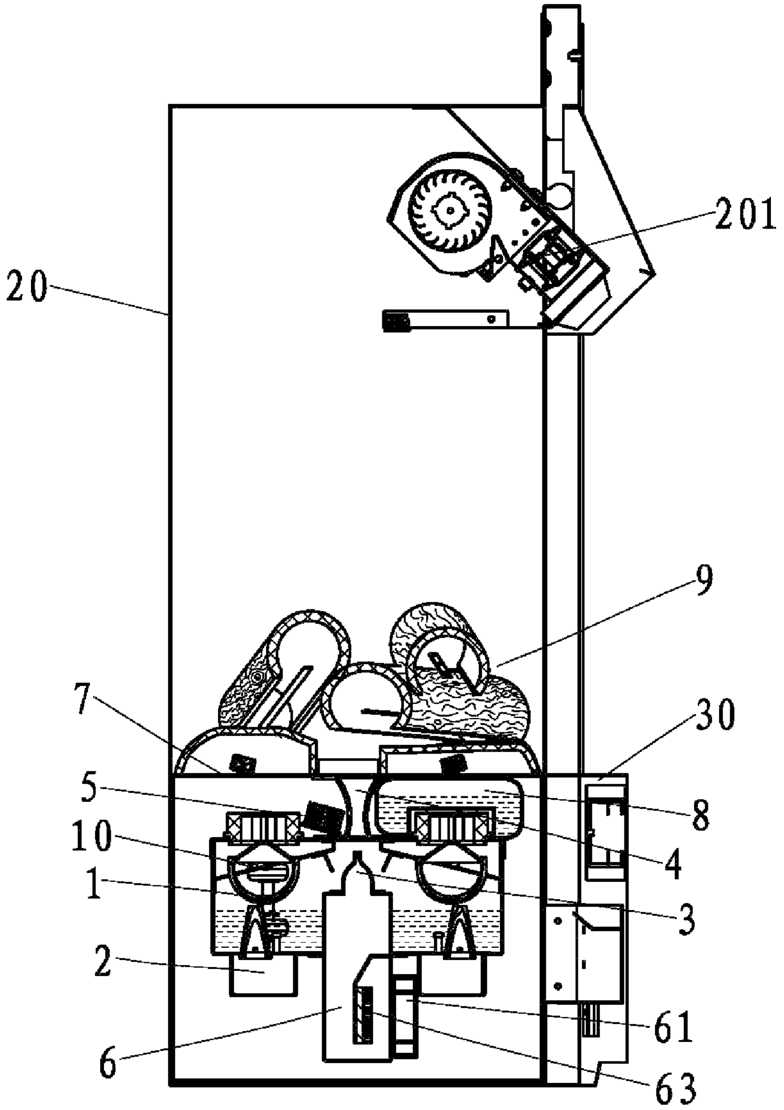
FIG. 23 is a schematic view showing a half cross-sectional structure of the atomizing simulation fireplace according to Embodiment 5 of the present invention.
Figure 24:
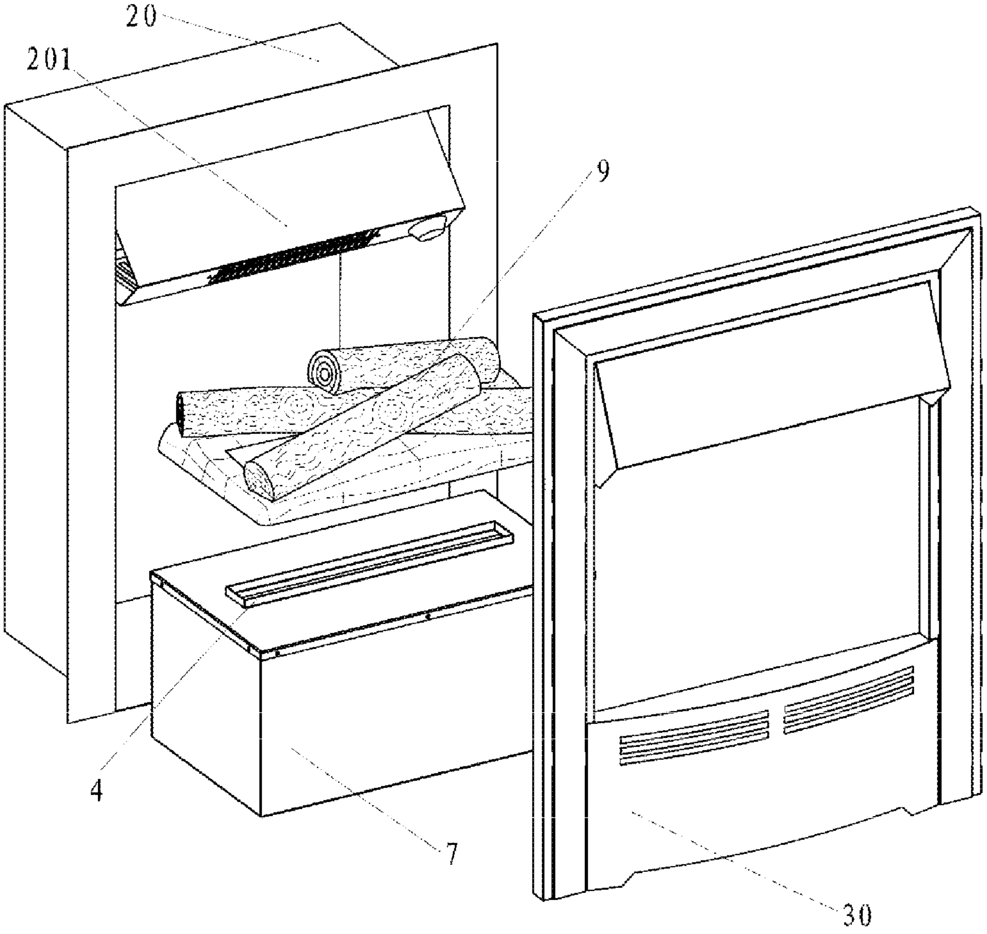
FIG. 24 is an exploded structural schematic view of the atomizing simulation fireplace according to Embodiment 5 of the present invention.

As shown in FIG. 22 to FIG. 24, a atomizing simulation fireplace further includes a fireplace cabinet 20 and a decorative frame 30 on the basis of Embodiment 3. The atomizing simulation fireplace of Embodiment 1 is integrally disposed on the lower side inside the fireplace cabinet 20. The decorative frame 30 is disposed outside the front surface of the fireplace cabinet 20 to increase the overall ornamental value of the atomizing simulation fireplace.

The top of the fireplace cabinet 20 is further provided with a heated air orifice device 201. The heated air orifice device 201 can blow hot air to the front surface of the fireplace cabinet 20, so that the atomizing simulation fireplace has a heating function while having an ornamental effect of flame. The air inlet of the heated air orifice device 201 faces the flame outlet 911. Since the heated air orifice device 201 forms a suction force when air enters and thus has a further upward driving effect on the mist fluttering out of the flame outlet 911 to further increase the height of the mist simulated flame.

The above description is only preferred embodiments of the utility model. It should be noted that those skilled in the art may also make improvements and modifications without departing from the technical principles of the utility model, and such improvements and modifications should also be considered to be within the protection scope of the present invention.

What is claimed is:

1. A flame simulating device, comprising an outer casing, having disposed therein a mist generating chamber, an atomizing head disposed below the mist generating chamber, wherein the atomizing head has an atomizing nozzle provided with an energy gathering cover, a water retaining shield arranged above the energy gathering cover, wherein the water retaining shield is fixed to an inclined plane on the upper portion inside the mist generating chamber, an air orifice and a nozzle that is in communication with the outside of the upper surface of the outer casing, wherein the nozzle is disposed above the mist generating chamber and the nozzle is elongated, the air orifice is disposed below the nozzle, the mist generating chamber is confined in a mist generating chamber housing, the mist generating chamber is provided with a mist outlet, the mist outlet, the air orifice and the nozzle communicate with each other, a light source, wherein the light source is disposed along a longitudinal direction of the nozzle and on one side or both sides of the nozzle and a transparent cover is disposed above the light source, wherein an air flow blown from the air orifice converges by an increasingly smaller width A of an air nozzle in the air orifice and is then discharged, and while flowing to the nozzle, the converging air flow in the air nozzle in the air orifice adsorbs and leads the mist out of the mist outlet under the Venturi effect to discharge from the air nozzle in the air orifice, wherein an air duct is disposed to be connected to the air orifice, and a fan is disposed on a side wall and/or a bottom wall of the air duct, the mist outlet is disposed along the longitudinal direction of the nozzle in communication with the outside of the upper surface of the outer casing and the nozzle in communication with the outside of the upper surface of the outer casing is defined by nozzle walls symmetrically on both sides in the longitudinal direction, and the surface of each nozzle wall is an arc-shaped curved surface defining a convex nozzle surface that produces a Coanda effect of the mist flowing through the nozzle, wherein a minimum width dimension B of the nozzle walls is smaller than a width dimension of an upper outlet end of the nozzle walls and a width dimension of a lower inlet end of the nozzle walls, in communication with the outside of the upper surface of the outer casing, at least the nozzle wall on one side of the light source is made of a transparent material, and light emitted from the light source is capable of irradiating on and above an outlet of the nozzle.

2. The flame simulating device according to claim 1, wherein the mist outlet is disposed close to the air orifice; and a water retaining plate is disposed before the mist outlet;

the air orifice is defined by air orifice walls on both sides in the longitudinal direction; and the mist outlet is defined by the air orifice walls and the mist generating chamber housing; and the cross-sectional shape of the air orifice is a flared, triangular or trapezoidal shape that is constricted with a transition, and the air nozzle is formed at the constricted portion.

3. The flame simulating device according to claim 1, wherein the air duct is disposed below the air orifice and uniformly arranged along the longitudinal direction of the air orifice.

4. The flame simulating device according to claim 3, wherein the inside of the air duct is provided with a plate or wall disposed in the longitudinal direction; the inside of the air duct is provided with a heating element; and the heating element is mounted on the plate or wall and facing the side of the fan.

5. The flame simulating device according to claim 3, wherein a dimension B of the cross section of the nozzle closest to the curved surface of the nozzle walls on both sides is in the range of 2 mm~20 mm; and a width dimension A of the air nozzle is in the range of 0.5 mm-6 mm.

6. The flame simulating device according to claim 1, wherein a central axis of the nozzle coincides with a central axis of the air orifice along the longitudinal direction of the nozzle.

7. An atomizing simulation fireplace, comprising the flame simulating device according to claim 2.

8. The atomizing simulation fireplace according to claim 7, further comprising and a simulated fuel bed;

light emitted from the light source is capable of irradiating on and above an outlet of the nozzle; and the mist generating chamber, an atomizing head, the air orifice, the nozzle and the light source are all disposed inside the outer casing, and the simulated fuel bed is disposed on an upper surface of the outer casing.

9. The atomizing simulation fireplace according to claim 8, wherein the outlet of the nozzle communicates with the upper surface of the outer casing.

10. The atomizing simulation fireplace according to claim 9, wherein the simulated fuel bed is provided with a flame outlet facing the longitudinal direction of an outlet position of the nozzle;

the simulated fuel bed comprises a decoration; and the structure of the decoration is at least one of an ash bed, a simulated solid fuel, crystal stones, pebbles and glass blocks.

11. The atomizing simulation fireplace according to claim 10, wherein the transparent cover is disposed between an upper end opening of the nozzle and the outer casing, the transparent cover is capable of sealing a region between an opening on the outer casing and the nozzle, and the transparent cover is made of a transparent material.

12. The atomizing simulation fireplace according to claim 10, wherein the atomizing simulation fireplace further comprises a liquid level gauge and a liquid storage tank, the liquid level gauge is disposed in the mist generating chamber for detecting whether a liquid level in the mist generating chamber is within a required range, and the liquid storage tank stores a liquid and replenishes the mist generating chamber with the liquid.

13. The atomizing simulation fireplace according to claim 7, wherein the atomizing simulation fireplace can also be placed, in its entirety, into a fireplace cabinet.

14. A flame simulating method, comprising the following steps: providing a flame simulating device as in claim 1, wherein a liquid is atomized in the mist generating chamber to generate mist;

forming a low-pressure region, wherein the low-pressure region is adjacent to the mist outlet and communicates with the mist outlet; providing the nozzle communicating with the low-pressure region; wherein the nozzle is located above the low-pressure region; the low-pressure region adsorbs the mist in the mist generating chamber, causing the mist in the mist generating chamber to exit from the mist outlet and flow to the low-pressure region and then upward to the nozzle where it flows out;

providing the light source such that light emitted from the light source is capable of irradiating on and above an outlet of the nozzle and;

providing the transparent cover disposed above the light source.

15. The flame simulating method according to claim 14, wherein the low-pressure region is generated by the Venturi effect.

* * * * *